United States Patent
Kang et al.

(10) Patent No.: US 11,789,133 B2
(45) Date of Patent: Oct. 17, 2023

(54) TIME-OF-FLIGHT SENSOR AND METHOD OF CALIBRATING ERRORS IN THE SAME

(71) Applicant: Samsung Electronics Co., Ltd., Suwon-si (KR)

(72) Inventors: Muncheon Kang, Hwaseong-si (KR); Kwanghyuk Bae, Seoul (KR); Hayoung Ko, Seoul (KR); Duckchan Seo, Yongin-si (KR); Chulwoong Lee, Changwon-si (KR)

(73) Assignee: Samsung Electronics Co., Ltd.

( * ) Notice: Subject to any disclaimer, the term of this patent is extended or adjusted under 35 U.S.C. 154(b) by 673 days.

(21) Appl. No.: 16/829,467

(22) Filed: Mar. 25, 2020

(65) Prior Publication Data

US 2021/0080554 A1    Mar. 18, 2021

(30) Foreign Application Priority Data

Sep. 17, 2019  (KR) .................. 10-2019-0113980

(51) Int. Cl.
*G01S 17/08* (2006.01)
*G01S 7/48* (2006.01)
*G01S 7/497* (2006.01)

(52) U.S. Cl.
CPC ............ *G01S 7/497* (2013.01); *G01S 7/4808* (2013.01); *G01S 17/08* (2013.01)

(58) Field of Classification Search
USPC ................ 356/3, 4.1, 4.07, 5.04, 5.01
See application file for complete search history.

(56) References Cited

U.S. PATENT DOCUMENTS

| 7,450,220 B2 | 11/2008 | O'Connor et al. |
| 8,391,698 B2 | 3/2013 | Turley et al. |
| 8,587,771 B2 | 11/2013 | Xu et al. |
| 9,325,920 B2 | 4/2016 | Van Nieuwenhove et al. |
| 10,061,029 B2 | 8/2018 | Waligorski et al. |

(Continued)

FOREIGN PATENT DOCUMENTS

| DE | 10-2015-225192 | 6/2016 |
| DE | 10-2015-103472 | 9/2016 |

OTHER PUBLICATIONS

Curtis Jacob Ritter, Design and Simulation of a Current-Mode Logic Frequency (Year: 2017).*

(Continued)

*Primary Examiner* — Daquan Zhao
(74) *Attorney, Agent, or Firm* — Fish & Richardson P.C.

(57) ABSTRACT

A method of calibrating errors in a time-of-flight (ToF) sensor includes illuminating a test object with a transmission light that is modulated based on a modulation signal; generating, using a buffer chain circuit, a plurality of demodulation signals having different local delay phases; providing a plurality of measured phase differences by providing the plurality of demodulation signals to a plurality of pixel groups included in a ToF sensor to sample a reception light reflected from the test object based on the plurality of demodulation signals; determining a wiggling error based on the plurality of measured phase differences, the wiggling error depending on a phase difference between the transmission light and the reception light; and calibrating a measured distance from the ToF sensor to a target object based on the wiggling error.

10 Claims, 25 Drawing Sheets

(56) References Cited

U.S. PATENT DOCUMENTS

2017/0041589 A1* 2/2017 Patil .................... G01S 17/894
2017/0205497 A1 7/2017 Dorrington et al.
2017/0214901 A1 7/2017 Zhao et al.
2019/0072654 A1 3/2019 Becker

OTHER PUBLICATIONS

Office Action in German Appln. No. 102020113140.2, dated Apr. 3, 2023, 18 pages (with English translation).

* cited by examiner

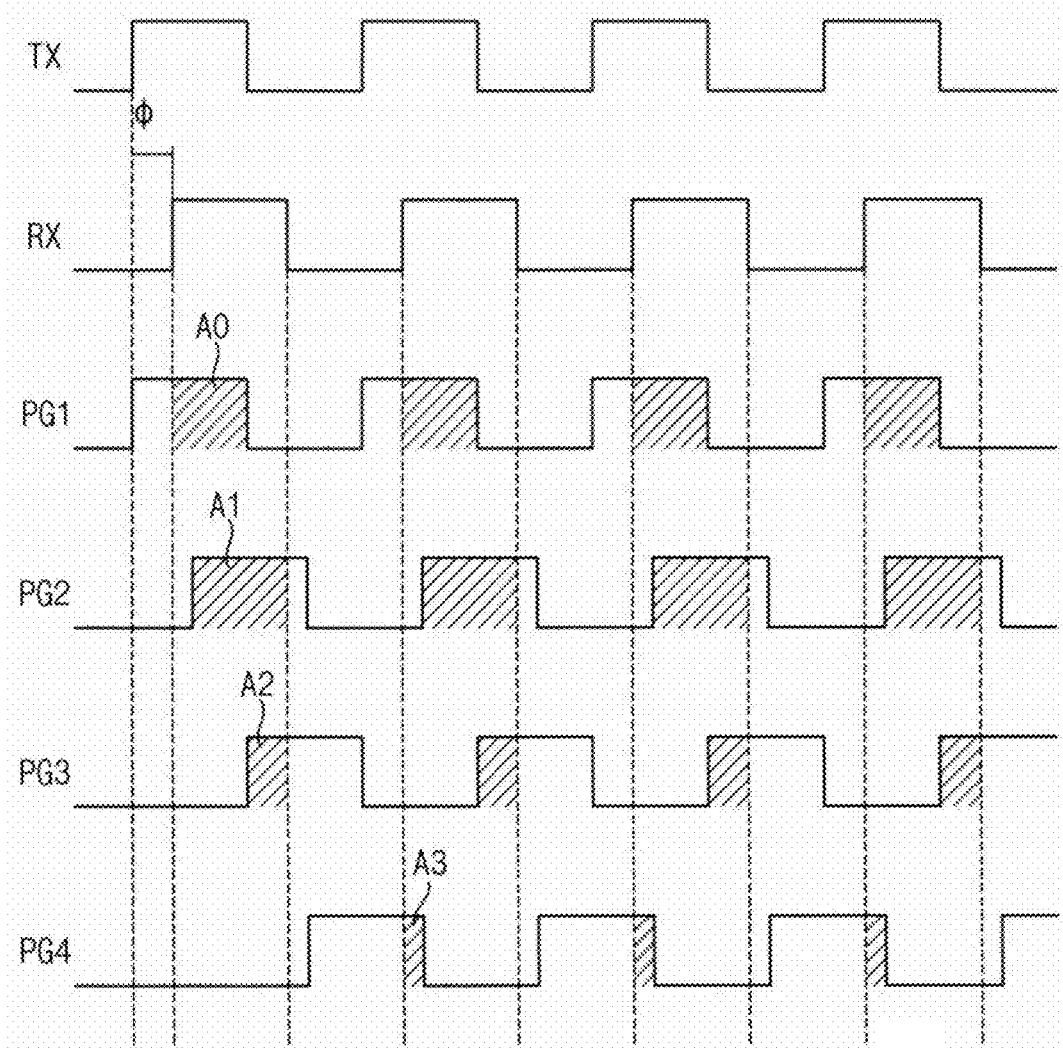

FIG. 18

| SEN1 | SEN2 | SEN3 | SEN4 |
|---|---|---|---|
| 54.5% @ 100MHz | 27.3% @ 100MHz | 1.87% @ 40MHz | 6% @ 20MHz |
| 43.6% @ 80MHz | 21.8% @ 80MHz | 0.93% @ 20MHz | |

_US 11,789,133 B2_

TIME-OF-FLIGHT SENSOR AND METHOD OF CALIBRATING ERRORS IN THE SAME

CROSS-REFERENCE TO RELATED APPLICATION

This U.S. non-provisional application claims priority under 35 USC § 119 to Korean Patent Application No. 10-2019-0113980, filed on Sep. 17, 2019, in the Korean Intellectual Property Office (KIPO), the disclosure of which is incorporated by reference herein in its entirety.

BACKGROUND

1. Technical Field

At least some example embodiments of the inventive concepts relate generally to semiconductor integrated circuits, and more particularly to a time-of-flight (ToF) sensor and method of calibrating errors in the ToF sensor.

2. Discussion of the Related Art

Recently interest in sensing to acquire three-dimensional information of an object is increasing and various three-dimensional cameras are developed. Among the three-dimensional cameras, a ToF sensor has advantages of simple circuit configuration and high distance resolution. The ToF sensor illuminates an object with a transmission light using a light source, and calculates a distance to the object by measuring a phase difference of a reception light reflected from the object. The reception light may be modeled as a sinusoidal wave for the distance calculation, and periodical errors may be caused due to a modeling error, which is referred to as a wiggling error. The wiggling error is a direct factor of degrading accuracy of the distance measurement by the ToF sensor.

SUMMARY

Some example embodiments may provide a method of calibrating errors in a time-of-flight (ToF) sensor capable of efficiently compensating a wiggling error caused in the ToF sensor.

Some example embodiments may provide a ToF sensor and a test system capable of efficiently correcting the wiggling error.

According to at least some example embodiments of the inventive concepts, a method of calibrating errors in a time-of-flight (ToF) sensor includes illuminating a test object with a transmission light that is modulated based on a modulation signal; generating, using a buffer chain circuit, a plurality of demodulation signals having different local delay phases; providing a plurality of measured phase differences by providing the plurality of demodulation signals to a plurality of pixel groups included in a ToF sensor to sample a reception light reflected from the test object based on the plurality of demodulation signals; determining a wiggling error based on the plurality of measured phase differences, the wiggling error depending on a phase difference between the transmission light and the reception light; and calibrating a measured distance from the ToF sensor to a target object based on the wiggling error.

According to at least some example embodiments of the inventive concepts, a test system includes a time-of-flight (ToF) sensor and a test device configured to measure a wiggling error of the ToF sensor. The ToF sensor includes a light source configured to illuminate a test object with a transmission light that is modulated based on a modulation signal, a buffer chain circuit configured to generate a plurality of demodulation signals having different local delay phases and a pixel array including a plurality of pixels configured to sample a reception light reflected from the test object based on the plurality of demodulation signals, the plurality of pixels being grouped into a plurality of pixel groups, each pixel group receiving the plurality of demodulation signals having each local delay phase.

According to at least some example embodiments of the inventive concepts, a time-of-flight (ToF) sensor includes a light source configured to illuminate a test object with a transmission light that is modulated based on a modulation signal, a buffer chain circuit configured to generate a plurality of demodulation signals having different local delay phases and a pixel array including a plurality of pixels configured to sample a reception light reflected from the test object based on the plurality of demodulation signals, the plurality of pixels being grouped into a plurality of pixel groups, each pixel group receiving the plurality of demodulation signals having each local delay phase.

The ToF sensor and the method of calibrating errors in the ToF sensor according to at least some example embodiments of the inventive concepts may improve efficiency and accuracy of error calibration of the ToF sensor by generating the local delay phases artificially using the buffer chain circuit.

The ToF sensor and the method of calibrating errors in the ToF sensor according to at least some example embodiments of the inventive concepts may obtain the wiggling error with a small number of measurement cycles because samples of various distances or phase differences may be obtained through a single chart image using the plurality of local delay phases and the variable global delay phase.

The ToF sensor and the method of calibrating errors in the ToF sensor according to at least some example embodiments of the inventive concepts may have no limits to a distance to the test object such as a plane chart, a tilt and a form of the test object, timing parameters of delay and so on because the method is based on assumption that the change of the phase difference is linear when the control code is changed for the global delay phase.

The ToF sensor and the method of calibrating errors in the ToF sensor according to at least some example embodiments of the inventive concepts may have an effect of spatial filtering to be robust to noises because data of many pixels are used in obtaining the wiggling error for each measured phase difference.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

FIG. 8 is a timing diagram for describing an operation of a ToF sensor.

FIG. 18 is a diagram for describing a local delay phase of a ToF sensor according to at least some example embodiments of the inventive concepts.

DETAILED DESCRIPTION OF THE EMBODIMENTS

Figure 1:
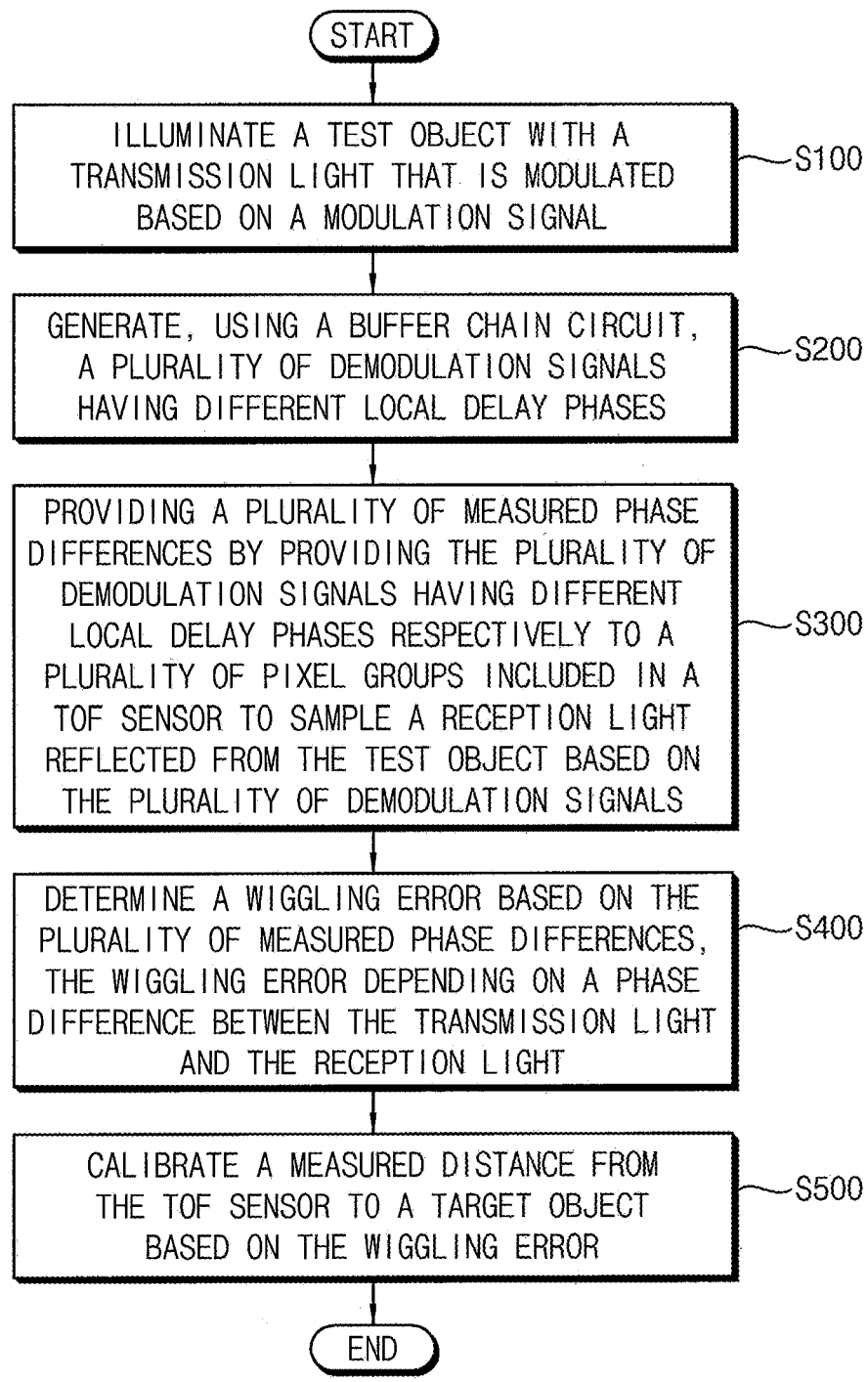
FIG. 1 is a flow chart illustrating a method of calibrating errors in a ToF sensor according to at least some example embodiments of the inventive concepts.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

FIG. 1 is a flow chart illustrating a method of calibrating errors in a ToF sensor according to at least some example embodiments of the inventive concepts.

FIG. 1 illustrates an error calibration method with respect to the ToF sensor configured to measure a distance to an object by illuminating an object with a transmission light using a light source and measuring a phase difference between a transmission light and a reception light.

Referring to FIG. 1, a test object is illuminated with a transmission light that is modulated based on a modulation signal (S100). For example, a light source may be turned on and off in response to the modulation signal toggling with a frequency of about 10 through 200 MHz.

Using a buffer chain circuit, a plurality of demodulation signals having different local delay phases are generated (S200). The buffer chain circuit may be integrated in the ToF sensor. An example embodiment of the buffer chain circuit will be described below with reference to FIG. 10.

A plurality of measured phase differences are provided by providing the plurality of demodulation signals to a plurality of pixel groups included in a ToF sensor to sample a reception light reflected from the test object based on the plurality of demodulation signals (S300). In some example embodiments, each of the plurality of pixel groups may include a pixel column including pixels disposed in each column. In at least some other example embodiments of the inventive concepts, each of the plurality of pixel groups may include a pixel row including pixels disposed in each row.

A wiggling error is determined based on the plurality of measured phase differences where the wiggling error depends on a phase difference between the transmission light and the reception light (S400). In some example embodiments, the wiggling error may be provided as a mapping table representing mapping relations between the plurality of measured phase differences and the plurality of representative offset values, as will be described below with reference to FIG. 17.

A measured distance from the ToF sensor to a target object is calibrated based on the wiggling error (S500).

As such the ToF sensor and the method of calibrating errors in the ToF sensor according to at least some example embodiments of the inventive concepts may improve efficiency and accuracy of error calibration of the ToF sensor by generating the local delay phases artificially using the buffer chain circuit.

In some example embodiments, the modulation signal may have different global delay phases respectively in a plurality of measurement cycles. In this case, the wiggling error may be obtained with a small number of measurement cycles because samples of various distances or phase differences may be obtained through a single chart image using the plurality of local delay phases and the variable global delay phase.

Figure 2:
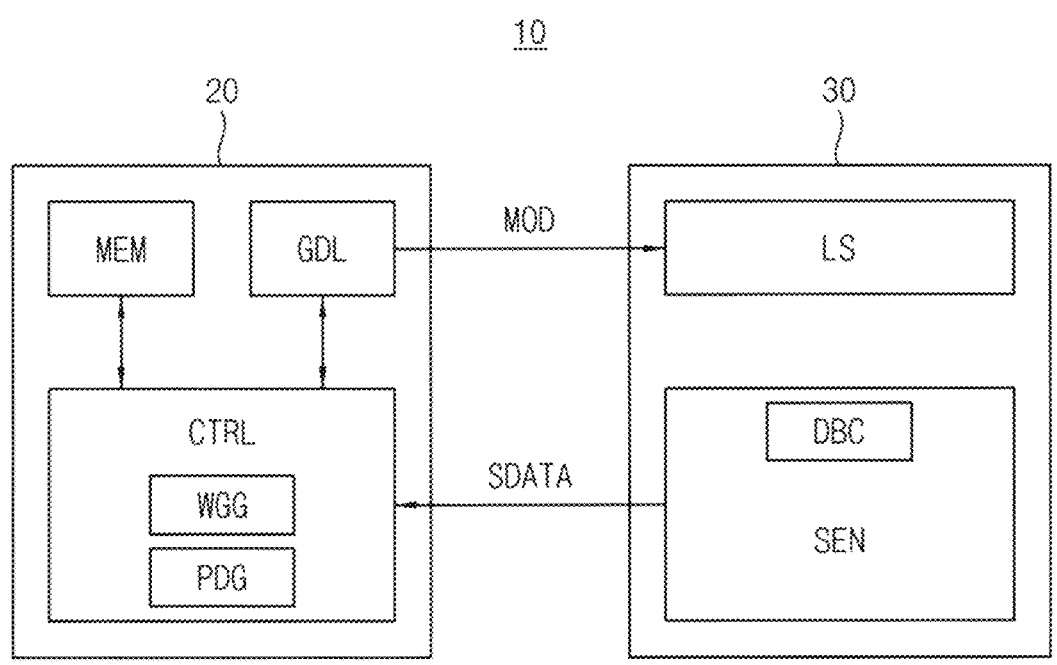
FIG. 2 is a block diagram illustrating a test system according to at least some example embodiments of the inventive concepts.

FIG. 2 is a block diagram illustrating a test system according to at least some example embodiments of the inventive concepts.

Referring to FIG. 2, a test system 10 may include a test device 20 and a ToF sensor 30 corresponding to a device under test.

The ToF sensor 30 may include a light source LS and a sensing unit SEN. The sensing unit SEN may include a pixel array (not shown) and a buffer chain circuit DBC A configuration and an operation of the ToF sensor will be described with reference to FIGS. 3 through 8.

The light source LS may illuminate a test object with a transmission light that is modulated based on a modulation signal MOD. The buffer chain circuit DBC may generate a plurality of demodulation signals having different local delay phases. The pixel array may include a plurality of pixels configured to sample a reception light reflected from the test object based on the plurality of demodulation signals. The plurality of pixels may be grouped into a plurality of pixel groups, and each pixel group may receive the plurality of demodulation signals having each local delay phase. Example embodiments of the buffer chain circuit DBC and the pixel groups will be described below with reference to FIGS. 10 and 11.

The test device 20 may include a controller CTRL, a memory MEM and a variable delay circuit GDL.

The controller CTRL may control overall operation of the test device 20, and the memory MEM may store data, control program codes, etc. for the operation of the test device 20.

The variable delay circuit GDL may generate the modulation signal MOD having different global delay phases respectively in a plurality of measurement cycles. The modulation signal MOD having the variable phase may be provided to the ToF sensor 30 from the test device 20. In some example embodiments, the variable delay circuit GDL may be included in the ToF sensor 30.

In some example embodiments, as will be described below with reference to FIG. 12, the variable delay circuit GDL may generate the modulation signal MOD based on a control code such that the modulation signal MOD has the variable delay corresponding to the control code. In this case, the test device 20 may change the control code sequentially in the plurality of measurement cycles such that the modulation signal MOD has the different global delay phases respectively in the plurality of measurement cycles.

The controller CTRL may include a phase difference generator PDG and an error generator WGG.

According to at least some example embodiments of the inventive concepts, the phase difference generator PDG may be, or include, a circuit or circuitry that is configured to provide a plurality of measured phase differences based on sample data SDATA provided from the ToF sensor 30. The phase difference generator PDG may also be referred to in the present specification as the phase difference generator circuit PDG. The ToF sensor 30 may sample the reception light reflected from the test object based on the plurality of demodulation signals. According to at least some example embodiments of the inventive concepts, the phase difference generator PDG may be disposed in the ToF sensor. In this case, the test device 20 may receive the plurality of measured phase differences from the ToF sensor 30 instead of the sample data SDATA.

The error generator WGG may be, or include, a circuit or circuitry that is configured to determine the wiggling error based on the plurality of measured phase differences. The error generator WGG may also be referred to in the present specification as the error generator circuit WGG. The wiggling error depends on a phase difference between the transmission light and the reception light.

Example implementations of the TOF sensor 30 will now be discussed below, with reference to TOF sensors 100 and 101 of FIGS. 3 and 4, respectively.

Figure 3:
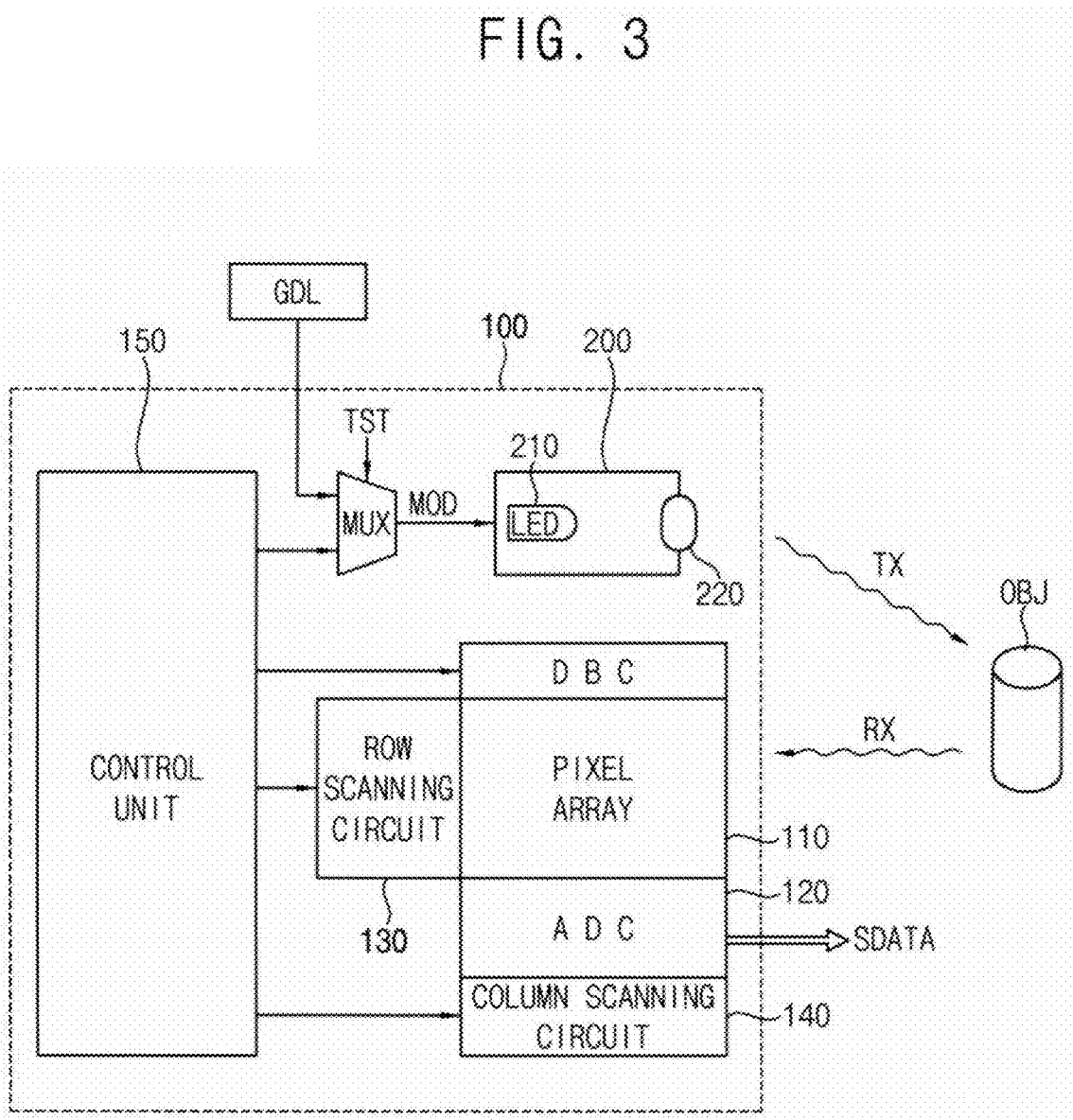
FIGS. 3 and 4 are diagrams illustrating a ToF sensor according to at least some example embodiments of the inventive concepts.
Figure 4:
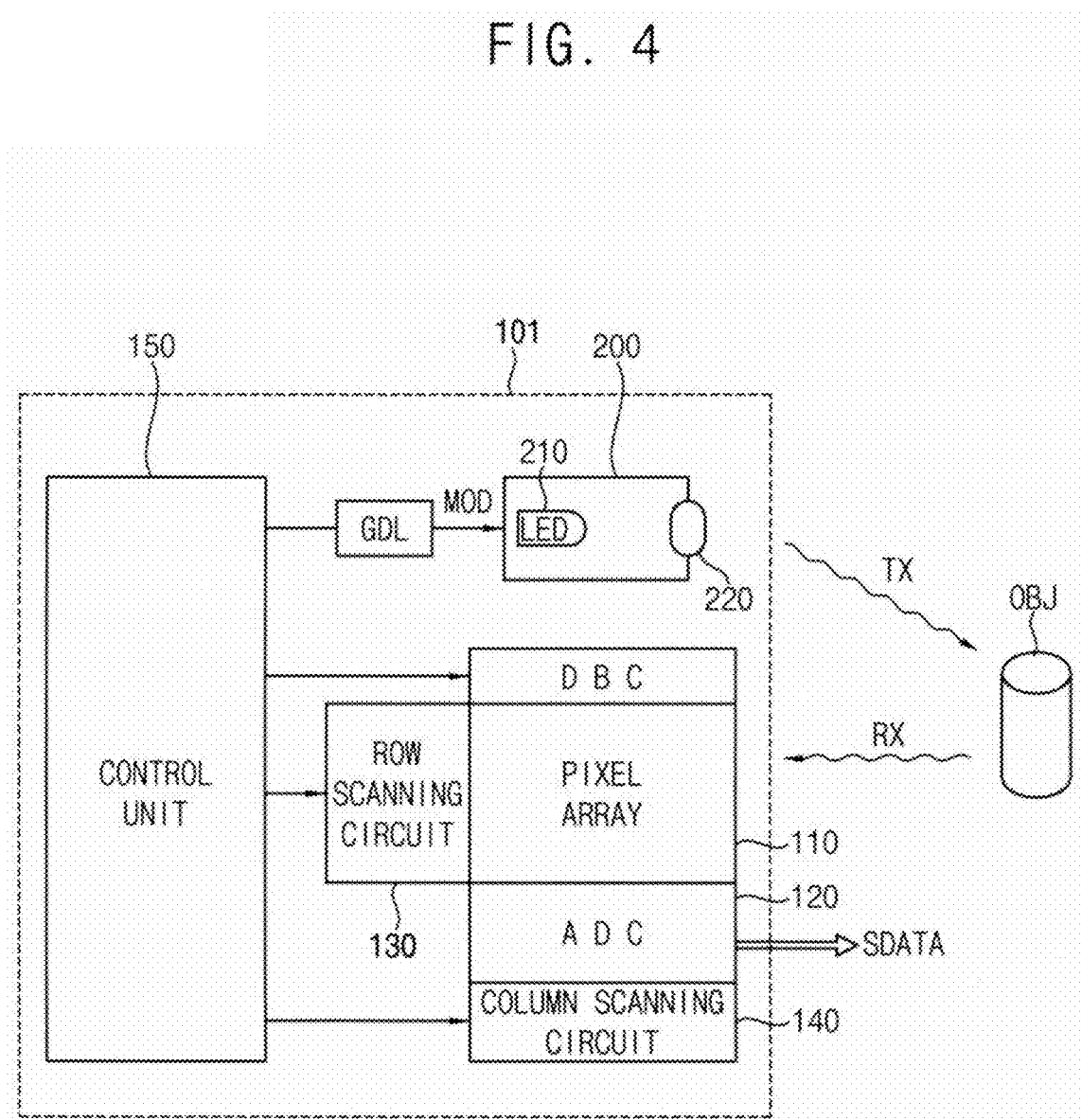

FIGS. 3 and 4 are diagrams illustrating a ToF sensor according to at least some example embodiments of the inventive concepts.

Referring to FIG. 3, a ToF sensor 100 includes a pixel array 110, a buffer chain circuit DBC, an analog-to-digital conversion (ADC) unit 120, a row scanning circuit 130, a column scanning circuit 140, a control unit 150 and a light source module 200. According to at least some example embodiments of the event concepts, the ADC unit 120 and control unit 150 may each be embodied by a circuit or circuitry. According to at least some example embodiments of the inventive concepts, the operations discussed below steps S100-S500 illustrated in FIG. 1 may be performed or, alternatively, controlled, by the controller 150.

The pixel array 110 may include depth pixels receiving light RX that is reflected from an object OBJ after being transmitted to the object OBJ by the light source module 200. The depth pixels may convert the reception light RX into electrical signals. The depth pixels may provide information about a distance of the object OBJ from the ToF sensor 100 and/or black-and-white image information.

The pixel array 110 may further include color pixels for providing color image information. In this case, the ToF sensor 100 may be a three-dimensional color image sensor that provides the color image information and the depth information. According to at least some example embodiments of the inventive concepts an infrared filter and/or a near-infrared filter may be formed on the depth pixels, and a color filter (e.g., red, green and blue filters) may be formed on the color pixels. According to at least some example embodiments of the inventive concepts, a ratio of the number of the depth pixels to the number of the color pixels may vary as desired.

The ADC unit 120 may convert an analog signal output from the pixel array 110 into a digital signal. According to at least some example embodiments of the inventive concepts, the ADC unit 120 may perform a column analog-to-digital conversion that converts analog signals in parallel using a plurality of analog-to-digital converters respectively coupled to a plurality of column lines. According to at least some example embodiments of the inventive concepts, the ADC unit 120 may perform a single analog-to-digital conversion that sequentially converts the analog signals using a single analog-to-digital converter.

According to at least some example embodiments of the inventive concepts, the ADC unit 120 may further include a correlated double sampling (CDS) unit for extracting an effective signal component. According to at least some example embodiments of the inventive concepts, the CDS unit may perform an analog double sampling that extracts the effective signal component based on a difference between an analog reset signal including a reset component and an analog data signal including a signal component. According to at least some example embodiments of the inventive concepts, the CDS unit may perform a digital double sampling that converts the analog reset signal and the analog data signal into two digital signals and extracts the effective signal component based on a difference between the two digital signals. According to at least some example embodiments of the inventive concepts, the CDS unit may perform a dual correlated double sampling that performs both the analog double sampling and the digital double sampling.

The row scanning circuit 130 may receive control signals from the control unit 150, and may control a row address and a row scan of the pixel array 110. To select a row line among a plurality of row lines, the row scanning circuit 130 may apply a signal for activating the selected row line to the pixel array 110. According to at least some example embodiments of the inventive concepts, the row scanning circuit 130 may include a row decoder that selects a row line of the pixel array 110 and a row driver that applies a signal for activating the selected row line.

The column scanning circuit 140 may receive control signals from the control unit 150, and may control a column address and a column scan of the pixel array 110. The column scanning circuit 140 may output a digital output signal from the ADC unit 120 to a digital signal processing circuit (not shown) and/or to an external host (not shown). For example, the column scanning circuit 140 may provide the ADC unit 120 with a horizontal scan control signal to sequentially select a plurality of analog-to-digital converters included in the ADC unit 120. According to at least some example embodiments of the inventive concepts, the column scanning circuit 140 may include a column decoder that selects one of the plurality of analog-to-digital converters and a column driver that applies an output of the selected analog-to-digital converter to a horizontal transmission line. The horizontal transmission line may have a bit width corresponding to that of the digital output signal.

The control unit 150 may control the ADC unit 120, the row scanning circuit 130, the column scanning circuit 140, the buffer chain circuit DBC and the light source module 200. The control unit 150 may provide the ADC unit 120, the row scanning circuit 130, the column scanning circuit 140, the buffer chain circuit DBC and the light source module 200 with control signals, such as a clock signal, a timing control signal, or the like. According to at least some example embodiments of the inventive concepts the control unit 150 may include a control logic circuit, a phase locked loop circuit, a timing control circuit, a communication interface circuit, or the like.

The light source module 200 may emit light of a desired (or, alternatively predetermined) wavelength. For example, the light source module 200 may emit infrared light and/or near-infrared light. The light source module 200 may include a light source 210 and a lens 220. The light source 210 may be controlled by the control unit 150 to emit the light TX of a desired intensity and/or characteristic (for example, periodic). For example, the intensity and/or characteristic of the light TX may be controlled such that the light TX has a waveform of a pulse wave, a sine wave, a cosine wave, or the like. The light source 210 may be implemented by a light emitting diode (LED), a laser diode, or the like.

Hereinafter, a normal operation of the ToF sensor 100 according to at least some example embodiments of the inventive concepts will be described below.

The control unit 150 may control the light source module 200 to emit the light TX having the periodic intensity. The light TX emitted by the light source module 200 may be reflected from the object OBJ back to the ToF sensor 100 as the reception light RX. The reception light RX may be incident on the depth pixels, and the depth pixels may be activated by the row scanning circuit 130 to output analog signals corresponding to the reception light RX. The ADC unit 120 may convert the analog signals output from the depth pixels into sample data SDATA. The sample data SDATA may be provided to the control unit 150 by the column scanning circuit 140 and/or the ADC 120.

The control unit 150 may calculate a distance of the object OBJ from the ToF sensor 100, a horizontal position of the object OBJ, a vertical position of the object OBJ and/or a size of the object OBJ based on the sample data SDATA. The control unit 150 may control the emission angle or a projection (or incident) region of the light TX based on the distance, the horizontal position, the vertical position and/or the size of the object OBJ. For example, the control unit 150 may control an interval between the light source 210 and the lens 220, a relative position (or, a placement) of the light source 210 and the lens 220 with respect to each other, a refractive index of the lens 220, a curvature of the lens 220, or the like. Accordingly, the light TX emitted by the light source module 200 may be focused on a region where the object OBJ of interest is located, thereby improving the accuracy of the depth information provided from the depth pixels. Further, the control unit 150 may adjust an amplitude of the light TX (or the maximum intensity of the light TX during each period) according to a decrement or an increment of the emission angle of the light TX or according to a size of a region on which the light TX is projected (or incident). For example, the control unit 150 may decrease the amplitude of the light TX as the emission angle of the light TX decreases. As a result, in the ToF sensor 100 according to at least some example embodiments of the inventive concepts, the power consumption may be reduced.

The sample data SDATA and/or the depth information may be provided to the digital signal processing circuit and/or the external host. According to at least some example embodiments of the inventive concepts, the pixel array 110 may include color pixels, and the color image information as well as the depth information may be provided to the digital signal processing circuit and/or the external host.

Hereinafter, a calibration operation of the ToF sensor 100 according to at least some example embodiments of the inventive concepts will be described below.

In the calibration operation, a selector MUX may provide a modulation signal MOD provided from the variable delay circuit GDL instead of the signal from the control logic 150, to a light source module 200 in response to a test mode signal TST. As described above, the variable delay circuit GDL may generate the modulation signal MOD having the different global delay phases respectively in the plurality of measurement cycles.

The buffer chain circuit DBC may generate the plurality of demodulation signals having the different local delay phases.

The pixel array 110 may include a plurality of pixels configured to sample a reception light reflected from the test object based on the plurality of demodulation signals. The plurality of pixels may be grouped into a plurality of pixel groups, and each pixel group may receive the plurality of demodulation signals having each local delay phase.

The test device 20 in FIG. 2 may determine the wiggling error based on the plurality of measured phase differences, where the wiggling error depends on a phase difference between the transmission light and the reception light.

Example embodiments of determining a wiggling error will be described below with reference to FIGS. 15 through 17.

A ToF sensor 101 of FIG. 4 is substantially the same as the ToF sensor 100 of FIG. 3 except the variable delay circuit GDL, and the repeated descriptions are omitted.

In some example embodiments, as illustrated in FIG. 3, the variable delay circuit GDL may be disposed outside the ToF sensor 100. For example, the variable delay circuit GDL may be include in the test device 20 in FIG. 2. In this case, the test device 20 may provide the modulation signal MOD having the different global delay phases respectively in the plurality of measurement cycles to the ToF sensor 100.

In at least some other example embodiments of the inventive concepts, as illustrated in FIG. 4, the variable delay circuit GDL may be included in the ToF sensor 101. In this case, the test device 20 may provide a control signal to the ToF sensor 101 such that the ToF sensor may generate the modulation signal MOD having the different global delay phases respectively in the plurality of measurement cycles. For example, the control signal may be a control code of multiple bits that are changed sequentially in the plurality of measurement cycles.

Figure 5:
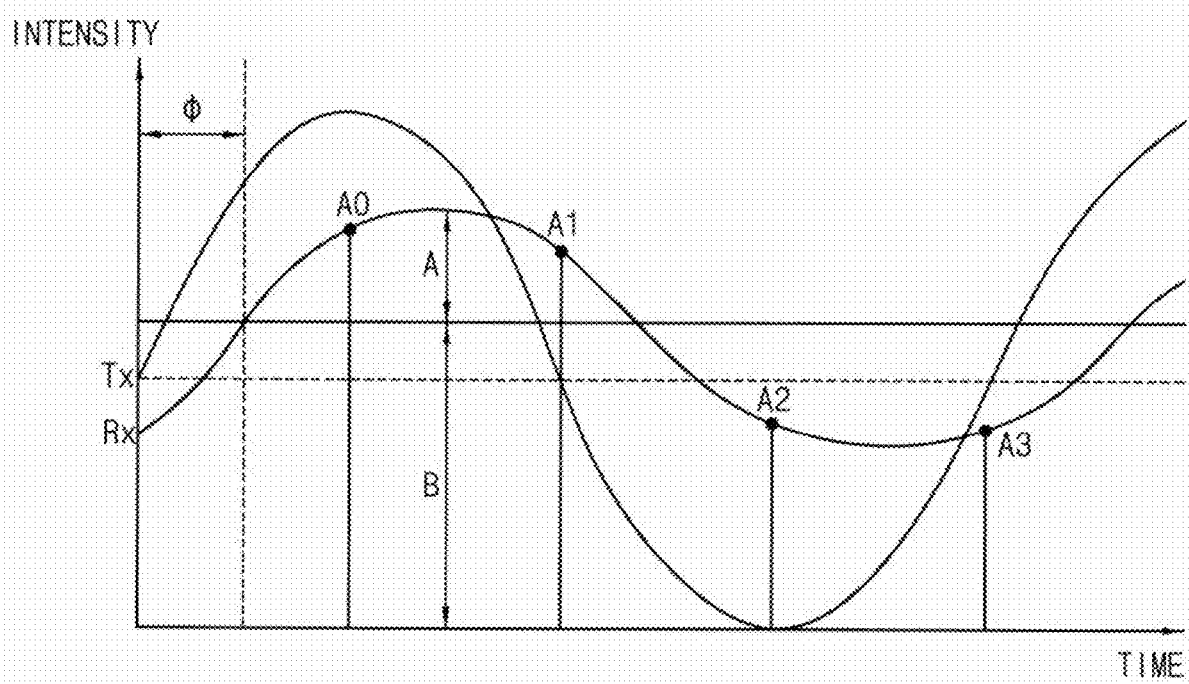
FIG. 5 is a diagram for describing an example method of calculating a distance to an object.

FIG. 5 is a diagram for describing an example method of calculating a distance to an object.

Referring to FIGS. 3 through 5, light TX emitted by a light source module 200 may have a periodic intensity and/or characteristic. For example, the intensity, i.e., the number of photons per unit area) of the light TX may have a waveform of a sine wave.

The light TX emitted by the light source module 200 may be reflected from the object OBJ, and then may be incident on the pixel array 110 as reception light RX. The pixel array 110 may periodically sample the reception light RX. According to at least some example embodiments of the inventive concepts, during each period of the reception light RX (for example, corresponding to a period of the transmitted light TX), the pixel array 110 may perform a sampling on the reception light RX by sampling, for example, at two sampling points having a phase difference of about 180 degrees, at four sampling points having a phase difference of about 90 degrees, or at more than four sampling points. For example, the pixel array 110 may extract four samples A0, A1, A2 and A3 of the reception light RX at phases of about 90 degrees, about 180 degrees, about 270 degrees and about 360 degrees per period, respectively.

The reception light RX may have an offset B that is different from an offset of the light TX emitted by the light source module 200 due to background light, a noise, or the like. The offset B of the reception light RX may be calculated by Equation 1.

$$B = \frac{A0 + A1 + A2 + A3}{4} \quad \text{[Equation 1]}$$

Here, A0 represents an intensity of the reception light RX sampled at a phase of about 90 degrees of the emitted light TX, A1 represents an intensity of the reception light RX sampled at a phase of about 180 degrees of the emitted light TX, A2 represents an intensity of the reception light RX sampled at a phase of about 270 degrees of the emitted light TX, and A3 represents an intensity of the reception light RX sampled at a phase of about 360 degrees of the emitted light TX.

The reception light RX may have an amplitude A lower than that of the light TX emitted by the light source module 200 due to loss (for example, light loss). The amplitude A of the reception light RX may be calculated by Equation 2.

$$A = \frac{\sqrt{(A0 - A2)^2 + (A1 - A3)^2}}{2} \quad \text{[Equation 2]}$$

Black-and-white image information about the object OBJ may be provided by respective depth pixels included in the pixel array 110 based on the amplitude A of the reception light RX.

The reception light RX may be delayed by a phase difference Φ corresponding, for example, to a double of the distance of the object OBJ from the t ToF sensor 100 with respect to the emitted light TX. The phase difference Φ between the emitted light TX and the reception light RX may be calculated by Equation 3.

$$\phi = \arctan\left(\frac{A0 - A2}{A1 - A3}\right) \quad \text{[Equation 3]}$$

The phase difference Φ between the emitted light TX and the reception light RX may, for example, correspond to a time-of-flight (TOF). The distance of the object OBJ from the ToF sensor 100 may be calculated by an equation, "R=c*TOF/2", where R represents the distance of the object OBJ, and c represents the speed of light. Further, the distance of the object OBJ from the ToF sensor 100 may also be calculated by Equation 4 using the phase difference Φ between the emitted light TX and the reception light RX.

$$R = \frac{c}{4\pi f}\phi \quad \text{[Equation 4]}$$

Here, f represents a modulation frequency, which is a frequency of the intensity of the emitted light TX (or a frequency of the intensity of the reception light RX).

As described above, the ToF sensor 100 according to at least some example embodiments of the inventive concepts may obtain depth information about the object OBJ using the light TX emitted by the light source module 200. Although FIG. 5 illustrates the light TX of which the intensity has a waveform of a sine wave, the ToF sensor 100 may use the light TX of which the intensity has various types of waveforms, according to at least some example embodiments of the inventive concepts. Further, the ToF sensor 100 may extract the depth information according to the waveform of the intensity of the light TX, a structure of a depth pixel, or the like.

Figure 6:
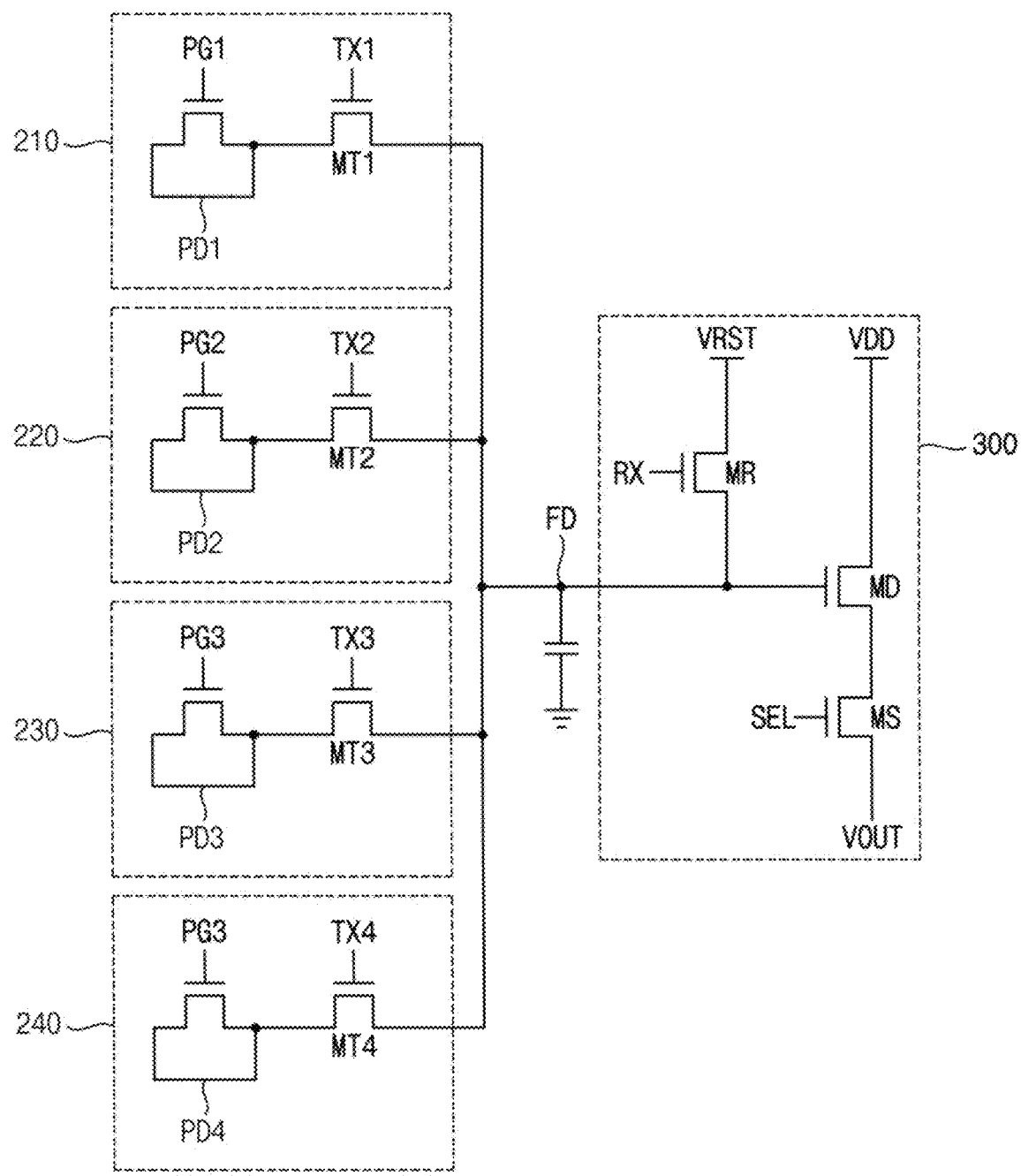
FIG. 6 is a diagram illustrating an example pixel structure of a ToF sensor according to at least some example embodiments of the inventive concepts.
Figure 7:
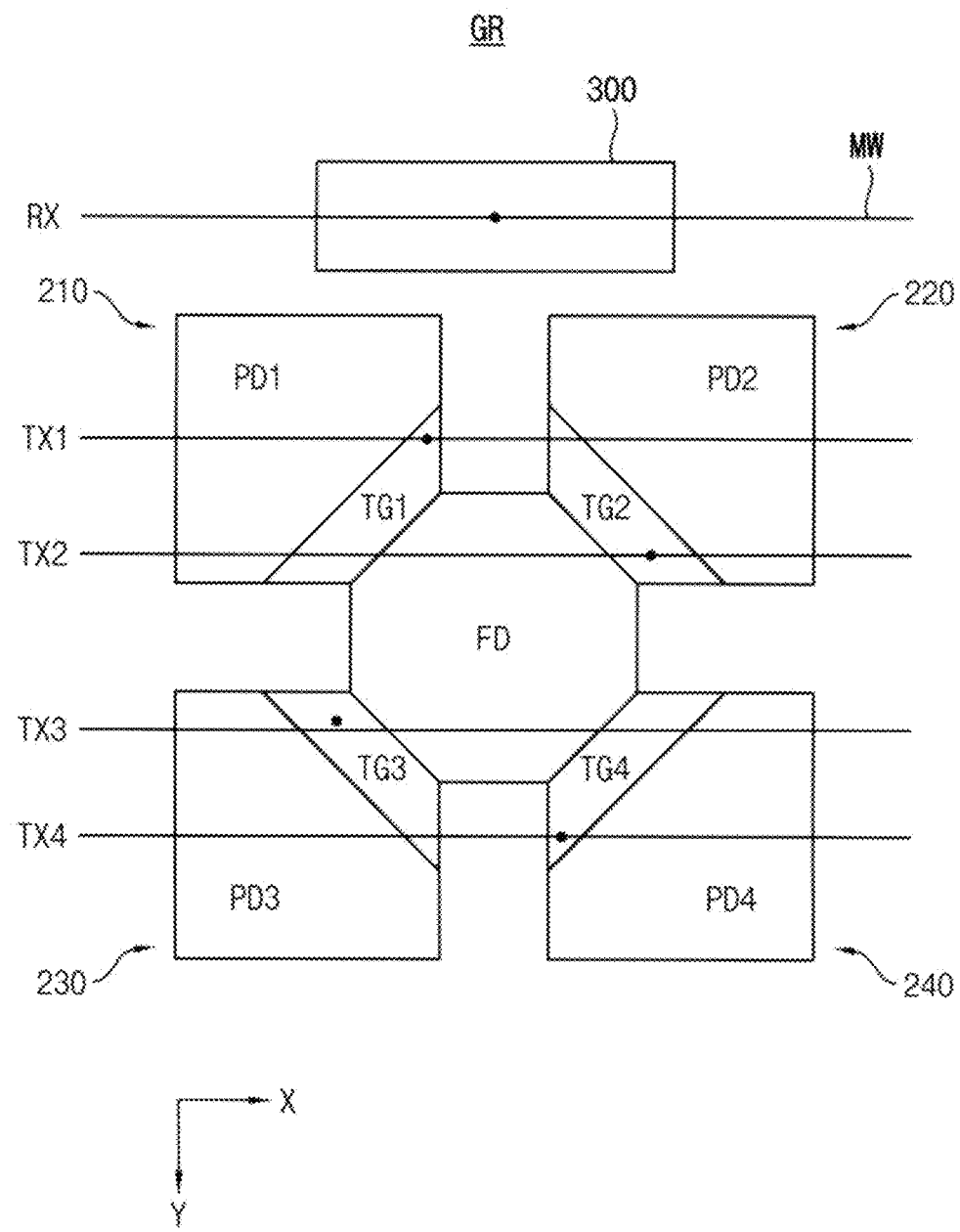
FIG. 7 is a top view illustrating a layout corresponding to the pixel structure of FIG. 6.

FIG. 6 is a diagram illustrating an example pixel structure of a ToF sensor according to at least some example embodiments of the inventive concepts, FIG. 7 is a top view illustrating a layout corresponding to the pixel structure of FIG. 6, and FIG. 8 is a timing diagram for describing an operation of a ToF sensor.

Referring to FIGS. 6 and 7, a pixel set GR may include a floating diffusion node FD, a first pixel 210, a second pixel 220, a third pixel 230, a fourth pixel 240, and a read circuit 300. The first pixel 210, the second pixel 220, the third pixel 230, and the fourth pixel 240 may be commonly connected to the floating diffusion node FD. The pixel set GR, as illustrated in FIGS. 6 and 7, may be arranged repeatedly in a row direction and a column direction in the pixel array 110 in FIG. 3.

Control signals TX1, TX2, TX3, TX4, and RX may be provided from the row driver 30 through wires MW extended in the row direction X.

The first pixel 210 may include a first photodiode PD1 and a first transfer transistor MT1. The second pixel 220 may include a second photodiode PD2 and a second transfer transistor MT2. The third pixel 230 may include a third photodiode PD3 and a third transfer transistor MT3. The fourth pixel 240 may include a fourth photodiode PD4 and a fourth transfer transistor MT4. Each of the first through fourth photodiodes PD1~PD4 may collect photo charged corresponding to each phase of first through fourth photogate control signals PG1~PG4. The control signals TX1, TX2, TX3 and TX4 may be applied to transfer gates TG1~TG4, that is, the gate electrodes of the transfer transistors MT1~MT4, respectively.

The read circuit 300 may include a reset transistor MR, a source follower transistor or a driving transistor MD, and a selection transistor MS. FIG. 6 illustrates a non-limiting example where each pixel includes one transistor and the read circuit includes three transistors, but the method according to at least some example embodiments of the inventive concepts may be applied to operate an image sensor of various configurations other than that of FIG. 6.

FIG. 8 illustrates modulation timing represented by the transmission light TX and demodulation timings represented by the photogate control signals PG1~PG4 with respect to the pixel structure of FIGS. 6 and 7.

Referring to FIG. 8, the transmission light TX from the light source may be output in synchronization with the modulation signal MOD. The first through fourth photogate control signals PG1~PG4 are generated in synchronization with the demodulation signal DEM. The first through fourth photogate control signals PG1~PG4 have phase differences of 0, 90, 180 and 270 degrees. As described above with reference to FIG. 5, four samples A0, A1, A2 and A3 of the reception light RX may be sampled at phases of about 90 degrees, about 180 degrees, about 270 degrees and about 360 degrees per period, respectively.

FIG. 8 illustrates an example that the phase of the first photogate control signal PG1 coincides with the phase of the modulation signal MOD, that is, the phase of the transmission light TX, which means that the global delay phase is zero. According to at least some example embodiments of the inventive concepts, the modulation signal MOD may have the different global delay phases respectively in the plurality of measurement cycles and thus the artificial distance difference may be caused so that the test object may not move in the compensation operation.

Figure 9A:
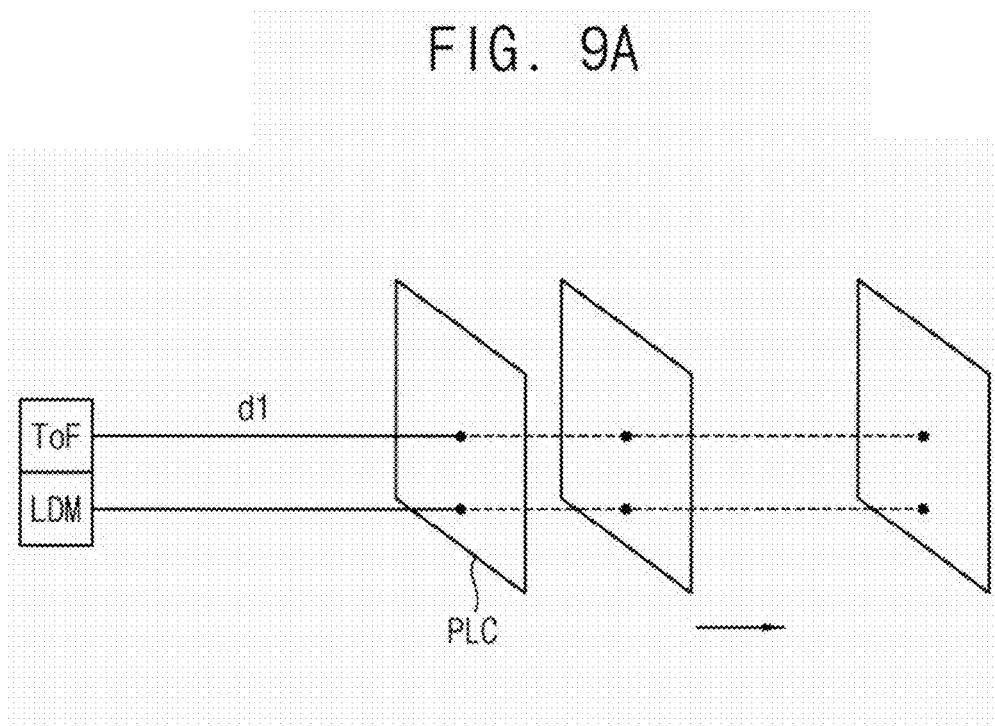
FIGS. 9A and 9B are diagrams for describing method of measuring a wiggling error.
Figure 9B:
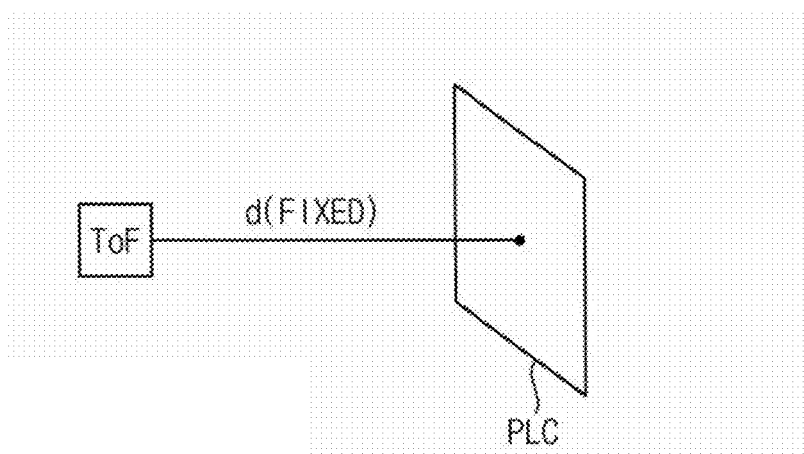

FIGS. 9A and 9B are diagrams for describing method of measuring a wiggling error.

The wiggling error is a kind of systematic error that is determined according to characteristics of the ToF sensor. The wiggling error may be removed by measuring errors corresponding to one cyclic period (that is, $2\pi$ or 360 degrees) of the modulation signal and the demodulation signal in the calibration operation, and the measured wiggling error may be reflected or compensated in the normal operation. To determine the wiggling error, it is required to measure various phase differences in one cyclic period as illustrated in FIGS. 9A and 9B.

Referring to FIG. 9A, the test object such as a plane chart PLC may be moved during a plurality of measurement cycles to change a distance dl between the ToF sensor and the plane chart PLC and to measure various phase differences. The changing distance dl may be measured, for example, using a laser distance measurement device LDM.

However, such methods require many measurement cycles to obtain the wiggling error of the entire distances, because the number of samples by one chart image is limited. In addition, it is not easy to obtain the accurate distance between the plane chart PLC and the ToF sensor and the methods are severely affected by noises in the sample data.

Referring to FIG. 9B, according to at least some example embodiments of the inventive concepts, the test object such as the plane chart may be fixed at a same position during the plurality of measurement cycles. As described above, the plurality of demodulation signals having different local delay phases may be generated using the buffer chain circuit in each measurement cycle and the plurality of demodulation signals having different local delay phases may be provided respective pixel groups. Accordingly various phase differences may be implemented per pixel group.

In addition, as described above, the modulation signal may be generated using the variable delay circuit to have different global delay phases per measurement cycle. In this case, the change of the global delay phase has the same effect that the plane chart PLC is moved even though the plane chart PLC is fixed.

As such, the ToF sensor and the method of calibrating errors in the ToF sensor according to at least some example embodiments of the inventive concepts may obtain the wiggling error with a small number of measurement cycles because samples of various distances or phase differences may be obtained through a single chart image using the plurality of local delay phases and the variable global delay phase.

Figure 10:
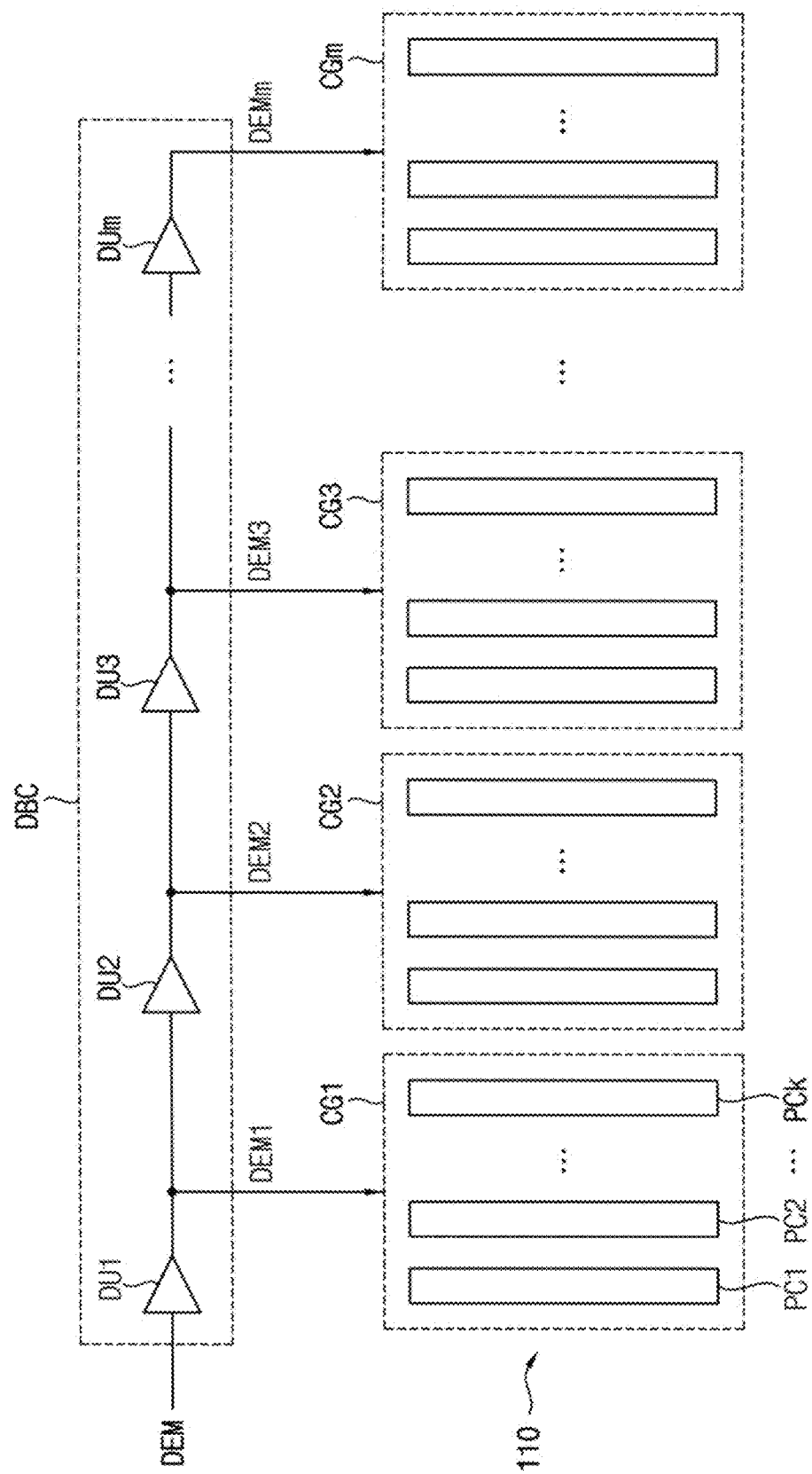
FIG. 10 is a diagram illustrating an example embodiment of a buffer chain circuit included in a ToF sensor according to at least some example embodiments of the inventive concepts.
Figure 11:
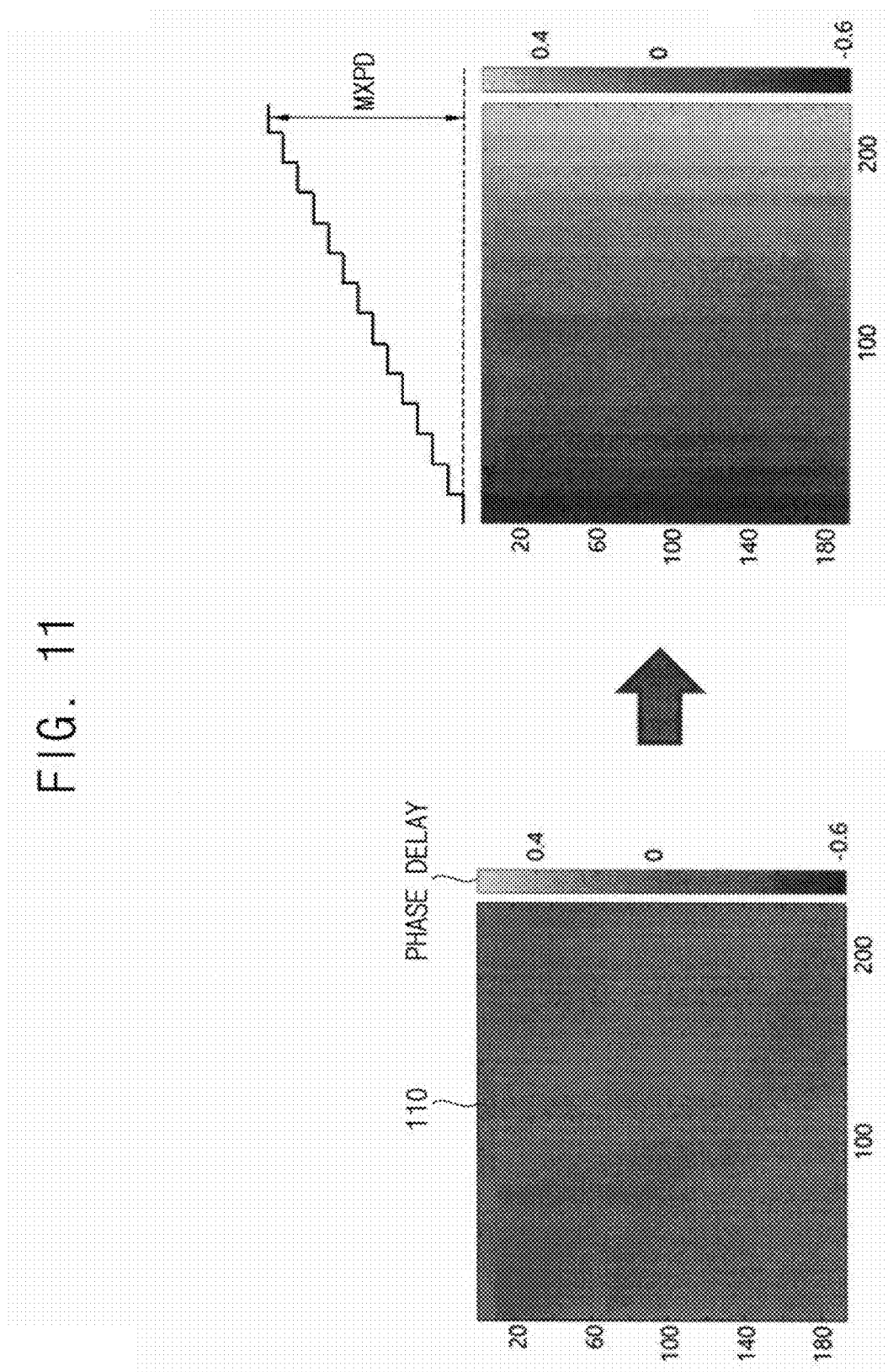
FIG. 11 is a diagram for describing local delay phases of a ToF sensor according to at least some example embodiments of the inventive concepts.

FIG. 10 is a diagram illustrating an example embodiment of a buffer chain circuit included in a ToF sensor according to at least some example embodiments of the inventive concepts, and FIG. 11 is a diagram for describing local delay phases of a ToF sensor according to at least some example embodiments of the inventive concepts.

Referring to FIG. 10, a buffer chain circuit DBC may include a plurality of delay buffer units DU1~DUm connected in series to generate the plurality of demodulation signals DEM1~DEMm. The plurality of delay buffer units DU1~DUm may delay a single DEM sequentially to generate the plurality of demodulation signals DEM1~DEMm having different local delay phases. Based on each of the demodulation signals DEM1~DEMm, the first through fourth photogate control signals PG1~PG4 in FIG. 8, which have fixed relative phase differences of 90, 180 and 270 degrees for the pixel set of FIGS. 6 and 7, may have the different local delay phase per pixel group. According to at least some example embodiments of the inventive concepts, the delay amounts of the delay buffer units DU1~DUm may be the same or different.

As illustrated in FIG. 10, the pixel array 110 may be grouped into a plurality of pixel groups CG1~CGm. For example each pixel group may include one or more pixel columns PC1~PCk. In some example embodiments, each of the plurality of pixel groups may include a pixel column including pixels disposed in each column as illustrated in FIG. 10. In at least some other example embodiments of the inventive concepts, each of the plurality of pixel groups may include a pixel row including pixels disposed in each row.

The pixel groups CG1~CGm receive the demodulation signals DEM1~DEMm, respectively, to sample the reception light reflected from the test object, and thus various phase differences may be measured by each chart image.

A phase delay of the pixel array 110 when the buffer chain circuit DBC is not used is shown in a left portion of FIG. 11, and a phase delay of the pixel array 110 when the buffer chain circuit DBC is used is shown in a right portion of FIG. 11. If the pixel groups are formed based on columns as FIG. 10, the phase delay may be increased in the right direction and a maximum phase difference MXPD may be realized between the most left pixel group and the most right pixel group.

As such, by applying the different phase delay per pixel group, various phase differences may be measured using one chart image.

Figure 12:
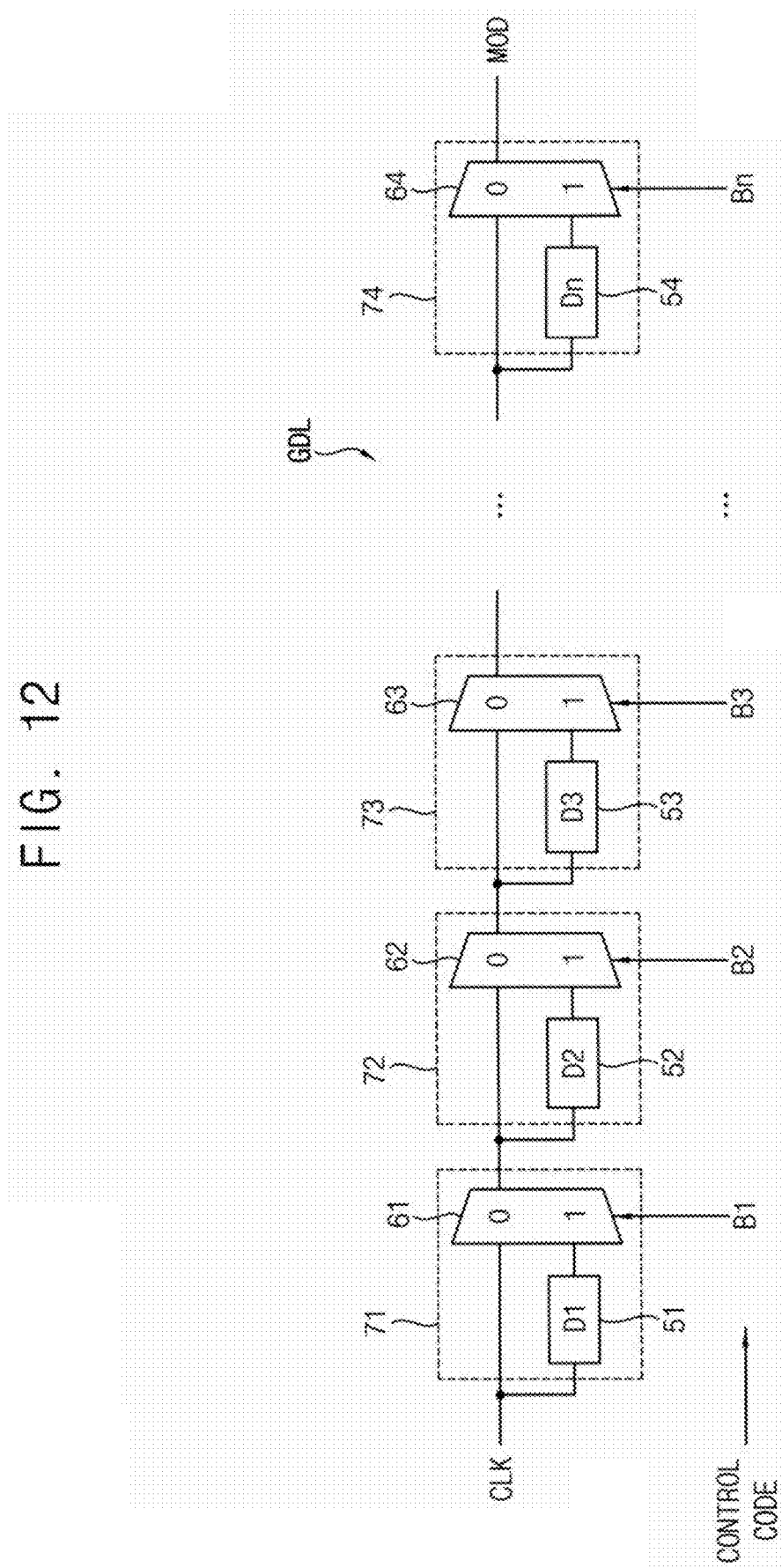
FIG. 12 is a diagram illustrating an example embodiment of a variable delay circuit included in a ToF sensor according to at least some example embodiments of the inventive concepts.

FIG. 12 is a diagram illustrating an example embodiment of a variable delay circuit included in a ToF sensor according to at least some example embodiments of the inventive concepts.

Referring to FIG. 12, a variable delay circuit GDL may include a plurality of delay units 71~74 that are connected serially. Each of the plurality delay units 71~74 may include each of delay circuits 51~54 and a selector 61~64. Each delay circuit may delay an output signal of the previous delay unit to output a delayed signal. Each selector may select and output one of the output signal of the previous delay unit and the delayed signal in response to each bit Bx of the control code [B1~Bn]. For example, the delay unit 72 may include the delay circuit 52 configured to delay the output signal of the previous delay unit 71 to output the delayed signal and the selector 62 configured to select and output one of the output signal of the previous delay unit 71 and the delayed signal of the delay unit 71 in response to each bit B2 of the control code [B1~Bn].

Figure 13:
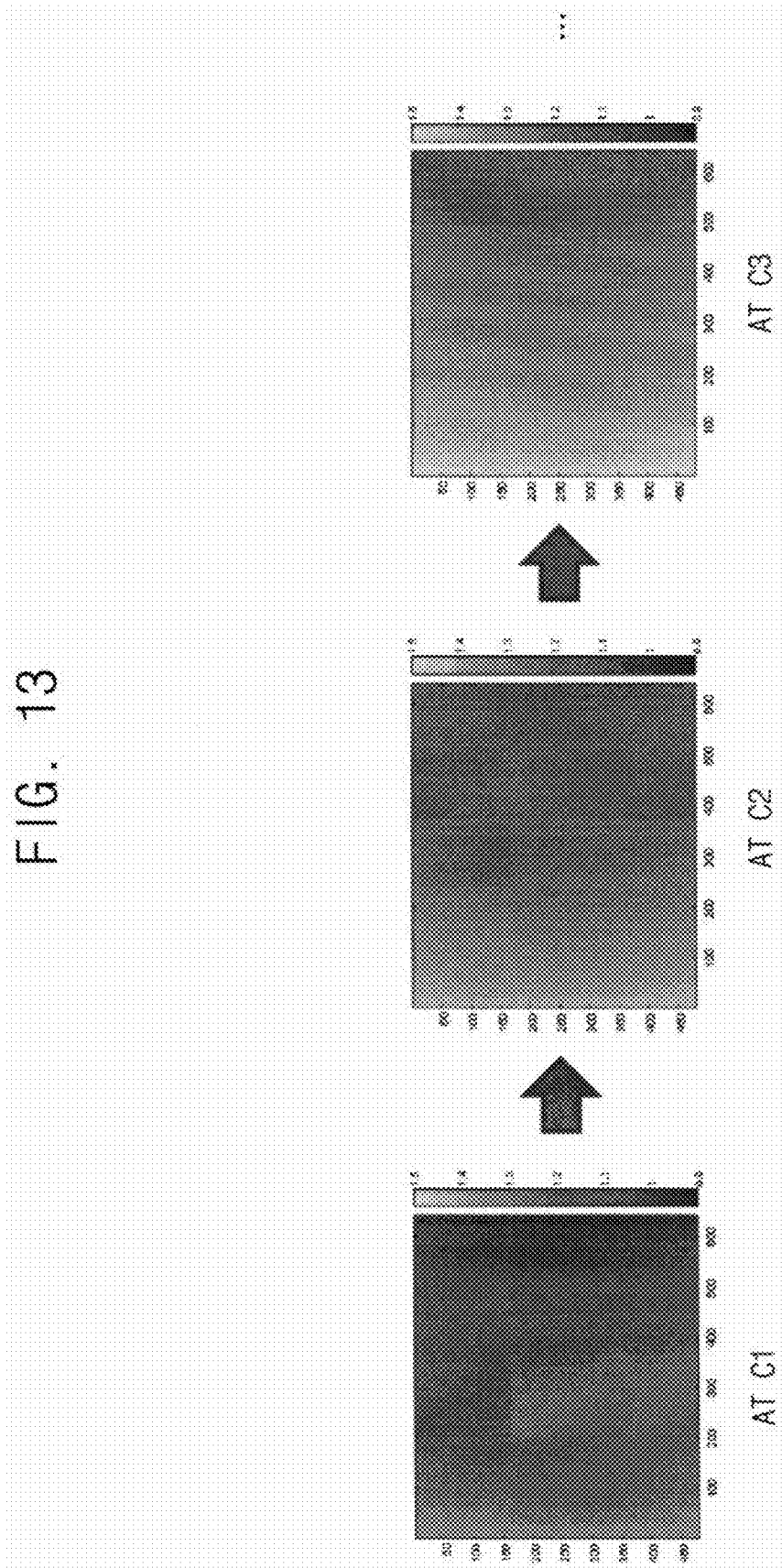
FIGS. 13 and 14 are diagrams for describing an operation of the variable delay circuit of FIG. 12.
Figure 14:
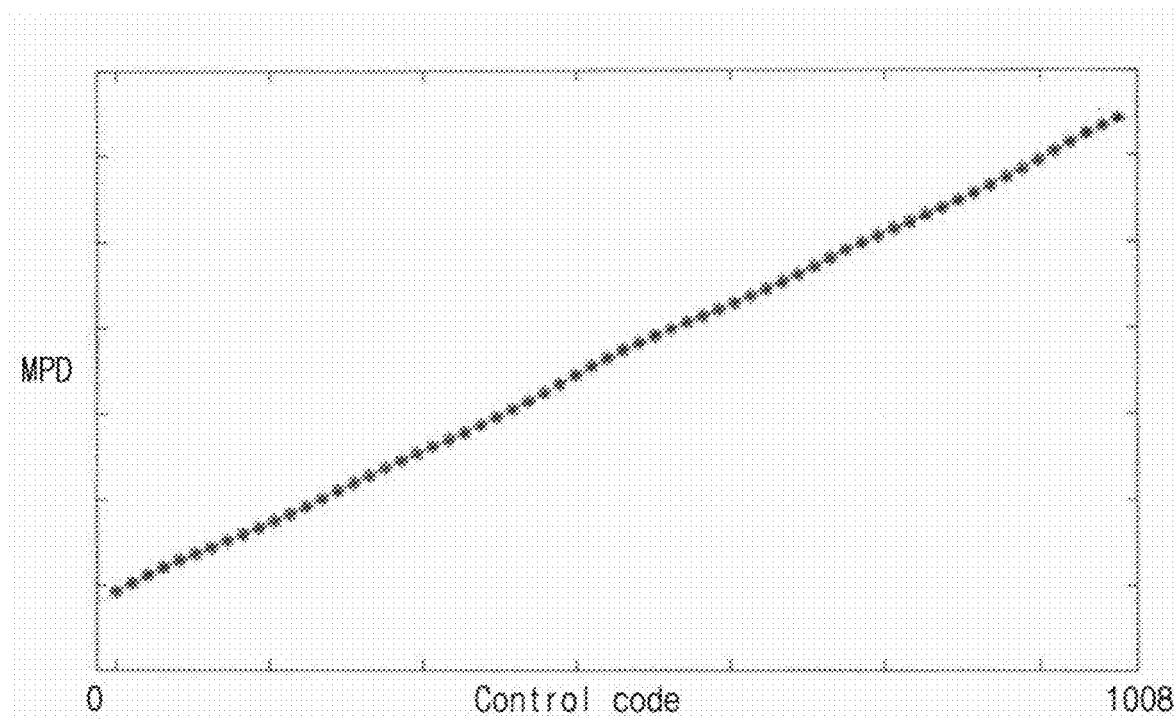

FIGS. 13 and 14 are diagrams for describing an operation of the variable delay circuit of FIG. 12.

FIG. 13 illustrates phase delays when the value of the control code is C1, C2 and C3 respectively in the three sequential measurement cycles. As such, the control code may be changed sequentially in the plurality of measurement cycles such that the modulation signal has the different global delay phases respectively in the plurality of measurement cycles. As described above, the pixel array has the different local delay phase per pixel group and also the different global delay phase per measurement cycle. As such, various phase differences may be measure efficiently by implementing the different global delay phases according to the measurement cycles and the different local delay phases according to the pixel position.

When the fixed plane chart PLC is captured as described with reference to FIG. 9B, an input phase difference φ may be modeled as Equation 5.

$$\varphi(c,x) = \varphi_{r0} + c\varphi_{t1} + \varphi_w(x) + \varphi_0(x) + N, \quad \text{[Equation 5]}$$

Here, x indicates a pixel position of the ToF sensor, $\varphi_{r0}$ indicates a basic delay phase difference, $\varphi_{t1}$ indicates a changing rate of the phase difference, c indicates the value of the control code $\varphi_w$, indicates the wiggling error, $\varphi_0$ indicates other phase difference including the local delay phase and so on, and N indicates a phase difference due to noises.

According to Equation 5, the factors changing the input phase difference φ are $c\varphi_{t1}$ and when the test object is captured during the plurality of measurement cycles with changing the control code. The operand $\varphi_{t1}$ is a constant value and thus increases linearly according to the control code. FIG. 14 illustrates the result of the measured phase difference MPD, which is measured for the center pixel of the pixel array while the value of the control code is increased.

As illustrated in FIG. 14, the real measured phase difference MPD may increase linearly according to the value of the control code. Her, the slight curvature in the graph represent the effect of the wiggling error. As will be described below with reference to FIGS. 15 through 17, first the changes of the phase differences are obtained per pixel, and the changing rate may be fitted to a linear function and the offset values may be obtained as the result of the fitting. The wiggling error may be determined using the offset values.

Figure 15:
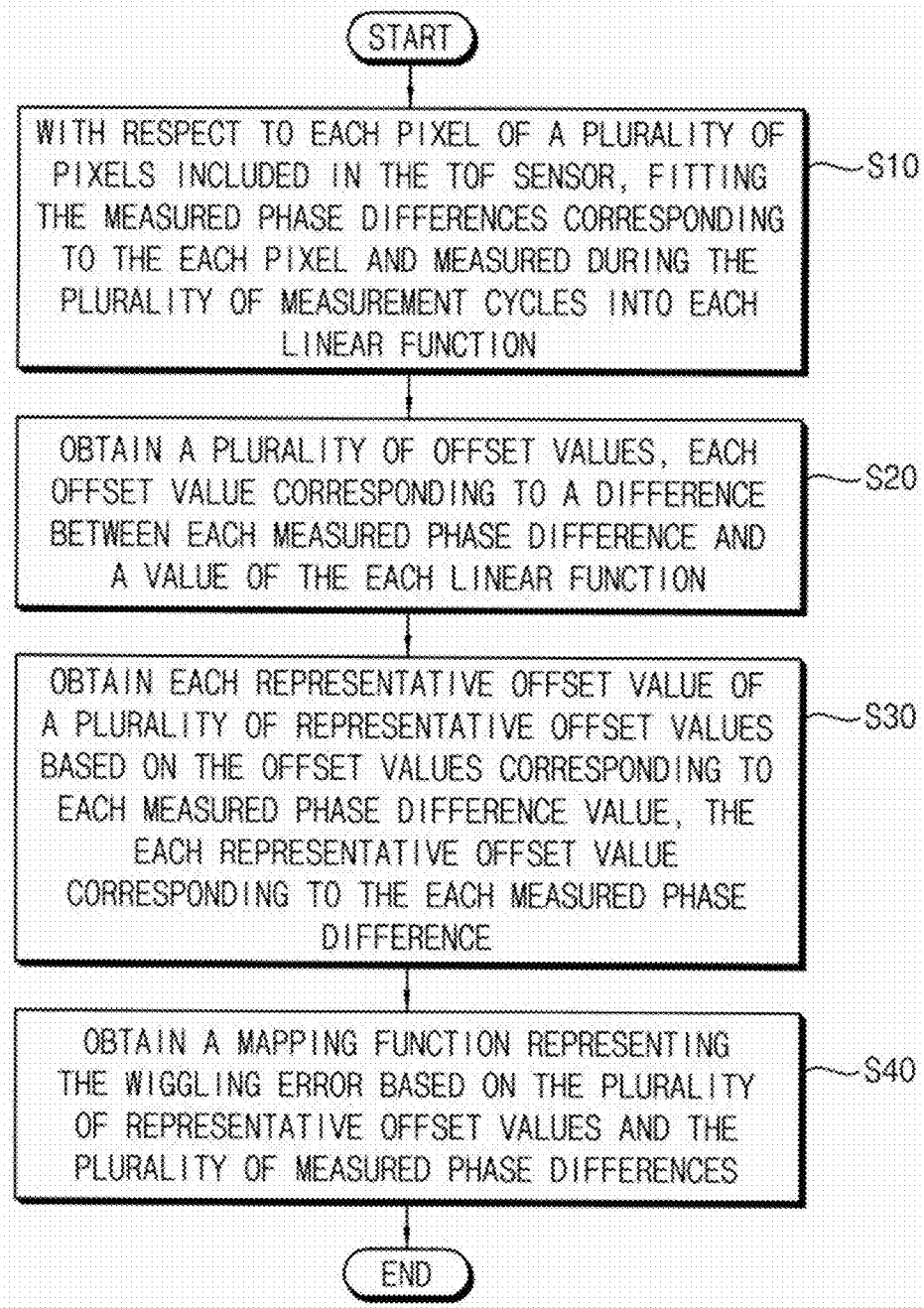
FIG. 15 is a flow chart illustrating an example embodiment of determining a wiggling error for a method of calibrating errors in the ToF sensor according to at least some example embodiments of the inventive concepts.
Figure 16:
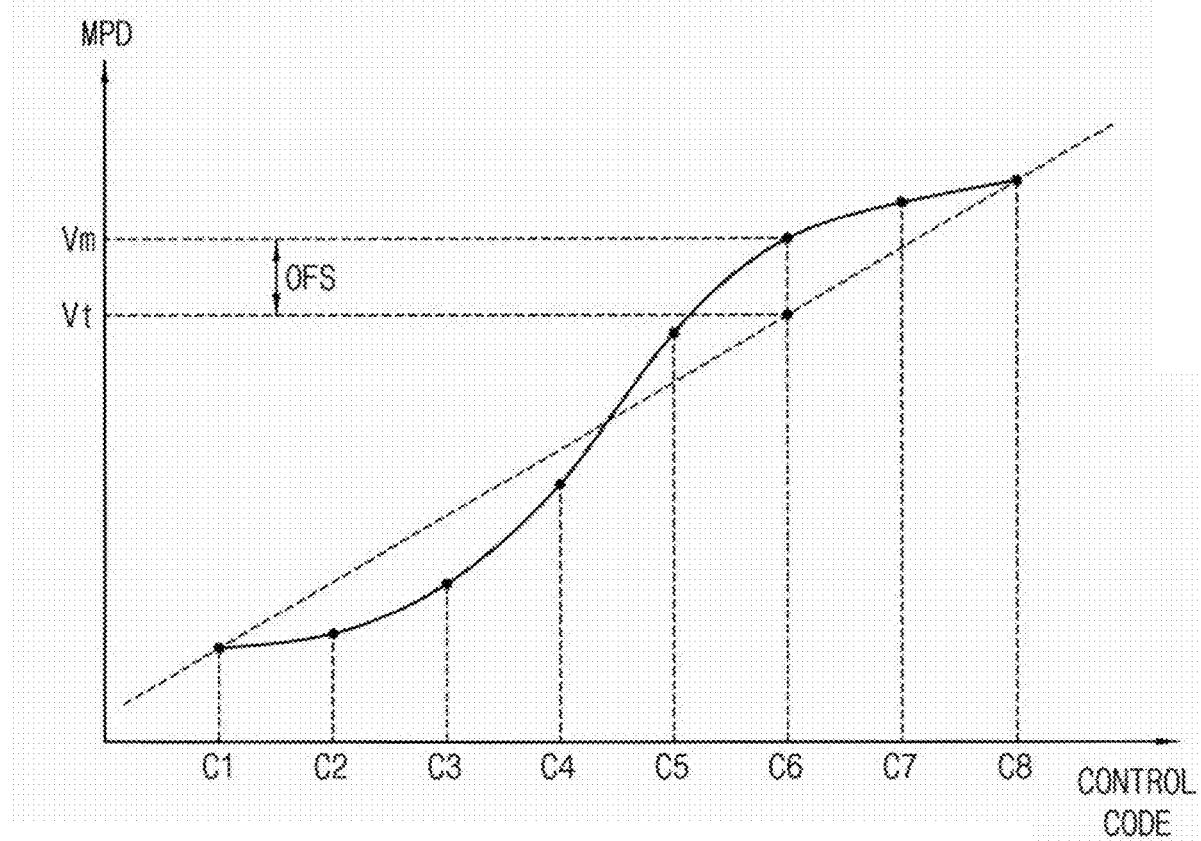
FIGS. 16 and 17 are diagrams for describing the determination of the wiggling error of FIG. 15.
Figure 17:

FIG. 15 is a flow chart illustrating an example embodiment of determining a wiggling error for a method of calibrating errors in the ToF sensor according to at least some example embodiments of the inventive concepts, and FIGS. 16 and 17 are diagrams for describing the determination of the wiggling error of FIG. 15. According to at least some example embodiments of the inventive concepts, the operations discussed below with respect to FIGS. 15-17 and steps S10-S40 may be performed by the test device 20 (e.g., the error generator WGG) illustrated in FIG. 2. Further, according to at least some example embodiments of the inventive concepts, the operations discussed below with respect to FIGS. 15-17 and steps S10-S40 may be performed or, alternatively, controlled, by the controller 150 illustrated in FIGS. 3 and 4.

Referring to FIG. 15, with respect to each pixel of a plurality of pixels included in the ToF sensor, the measured phase differences corresponding to each pixel and measured during the plurality of measurement cycles may be fitted into each linear function (S10).

A plurality of offset values may be obtained such that each offset value corresponds to a difference between each measured phase difference and a value of the each linear function (S20).

Each representative offset value of a plurality of representative offset values may be obtained based on the offset values corresponding to each measured phase difference value, where the each representative offset value corresponds to the each measured phase difference (S30).

A mapping function representing the wiggling error may be obtained based on the plurality of representative offset values and the plurality of measured phase differences (S40).

FIG. 16 illustrates the measured phase difference MPD corresponding to the values C1~C8 of the control code corresponding to the same pixel which is represented by dots, and the linear function as the result of the fitting.

As illustrated in FIG. 16, each offset value OFS corresponding to a difference between each measured phase difference Vm and each value Vt of the linear function may be obtained. As such, with respect to each pixel of a plurality of pixels included in the ToF sensor, a great number of offset values corresponding to various measured phase difference may be obtained.

A plurality of offset values OFS obtained as described above are illustrated in the left portion of FIG. 17. The offset values are arranged to the corresponding values V1~V6 of the measured phase difference MPD.

With respect to all values V1~V6 of the measured phase differences, each representative offset value ROFS may be based on the offset values corresponding to each measured phase difference value MPD. For example, an average of the offset values corresponding to the same measured phase difference may be determined as the representative offset value of the same measured phase difference, as illustrated in FIG. 17. Based on the representative offset values, the mapping function representing the wiggling error may be determined as will be described below with reference to FIG. 21. In some example embodiments, the mapping function may be provided as the mapping table TAB as illustrated in the right portion of FIG. 17 representing mapping relations between the plurality of measured phase differences and the plurality of representative offset values, which includes the mapping relation between the representative offset values and the measured phase differences.

FIG. 18 is a diagram for describing a local delay phase of a ToF sensor according to at least some example embodiments of the inventive concepts.

In FIG. 18, a first sensor SEN1 and a second sensor SEN2 correspond to ToF sensors according to at least some example embodiments of the inventive concepts, and a third sensor SEN3 and a fourth sensor SEN4 correspond to conventional ToF sensors. FIG. 18 illustrates an operation frequency in MHz for modulation and demodulation, and a rate (MXPD/$2\pi$) of the maximum phase difference MXPD with respect to one cycle period $2\pi$, for the respective sensors SEN~SEN4.

Even though the conventional sensors SEN3 and SEN4 have the local delay phase but the values are very small. When the light source of 100 MHz is used in the first sensor SEN1, the distance information of 54.5% of the one cycle period may be measured and sampled from one frame data of the test object.

Considering ideal cases, at 20 MHz, the third sensor SEN3 requires at least 108 measurement cycles, and the fourth sensor SEN4 requires at least 17 measurement cycles. However, the first sensor SEN1 according to at least some example embodiments of the inventive concepts may determine the wiggling error with respect to all the ranged through at least three measurement cycles at 80 MHz.

In addition, using the variable delay circuit GDL, which may be disposed in or outside the ToF sensor, the change of the global delay phase has the same effect that the test object such as the plane chart PLC is moved even though the plane chart PLC is fixed.

As such, various phase differences may be measure efficiently by implementing the different global delay phases according to the measurement cycles and the different local delay phases according to the pixel position.

FIGS. 19A through 21 are diagrams for describing effects by a method of calibrating errors in a ToF sensor according to at least some example embodiments of the inventive concepts.

FIGS. 19A through 21 illustrate results of wiggling calibration of the ToF sensor at an operation frequency of 100 MHz. The horizontal axis indicates a normalized phases 0~1 of the one cyclic period 0~$\pi$, and the vertical axis indicates the determined representative offset value of the wiggling error.

Figure 19A:
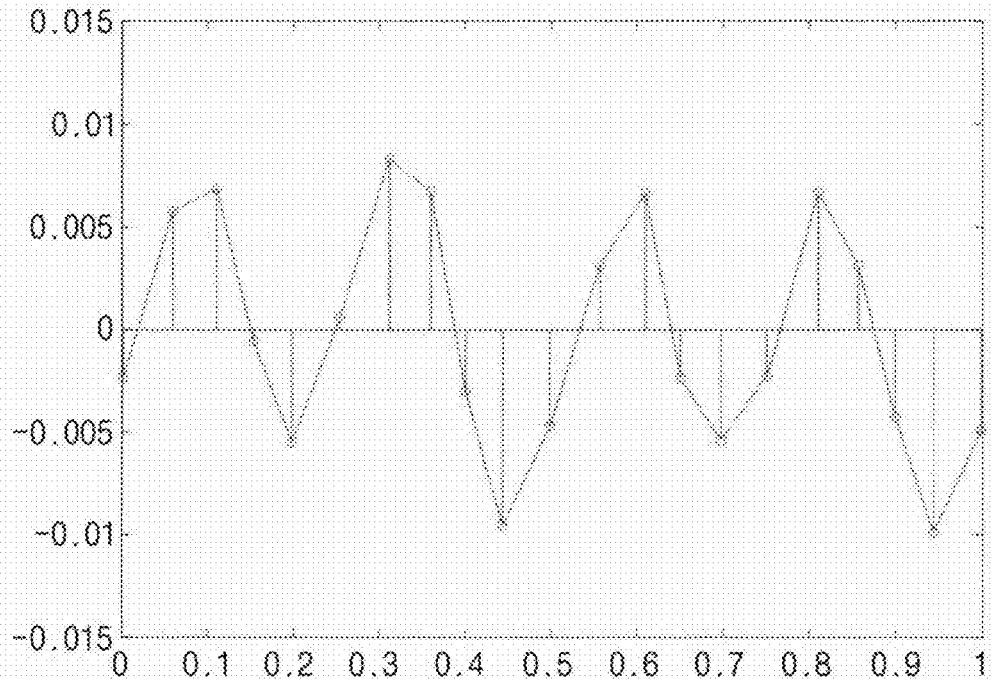
FIGS. 19A through 21 are diagram for describing effects by a method of calibrating errors in a ToF sensor according to at least some example embodiments of the inventive concepts.
Figure 19B:
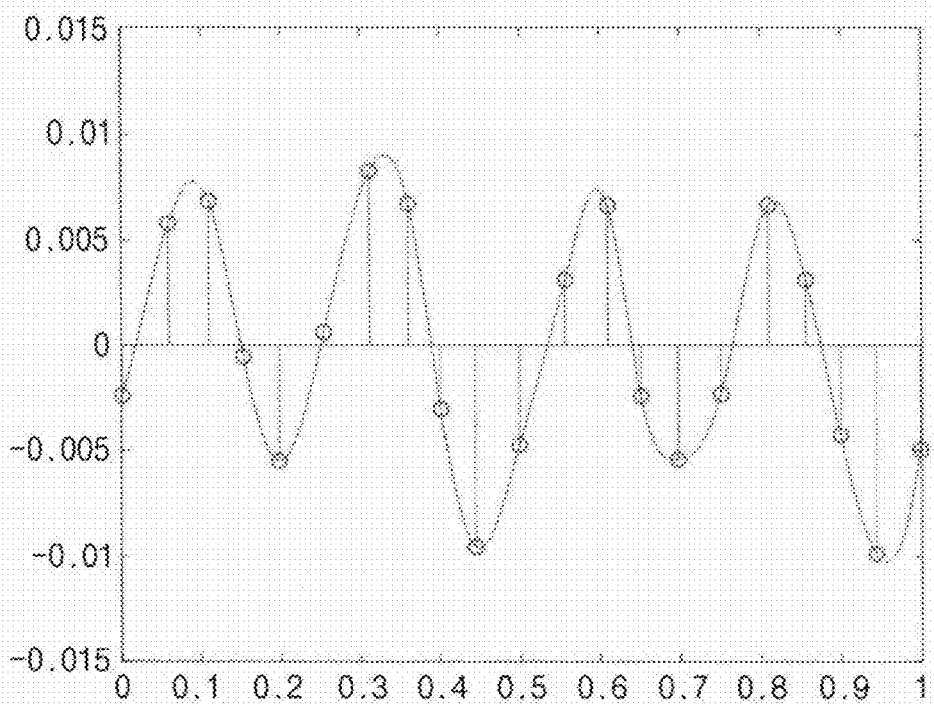
Figure 20A:
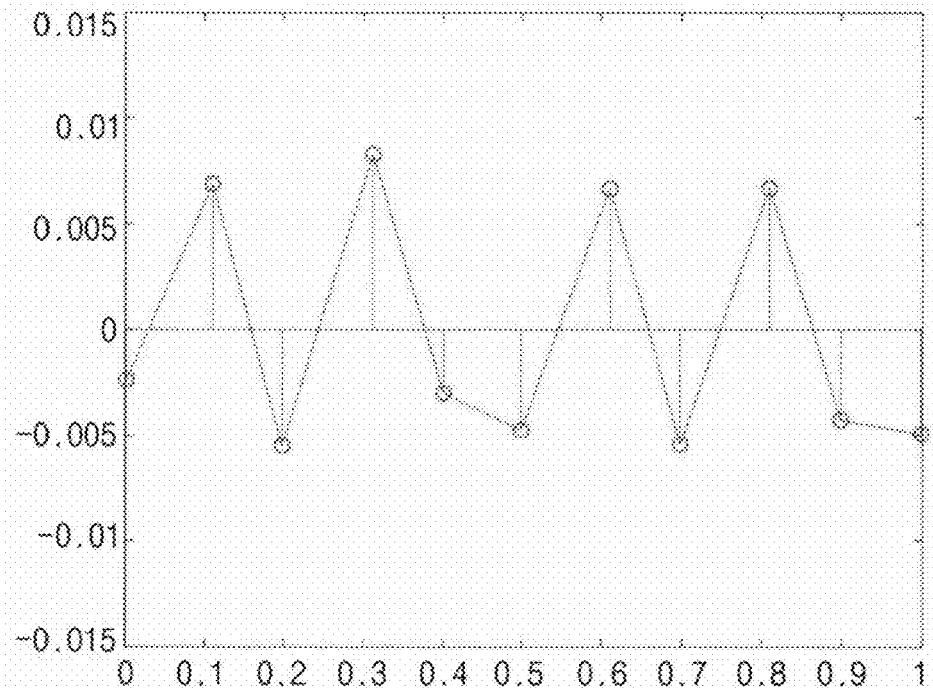
Figure 20B:
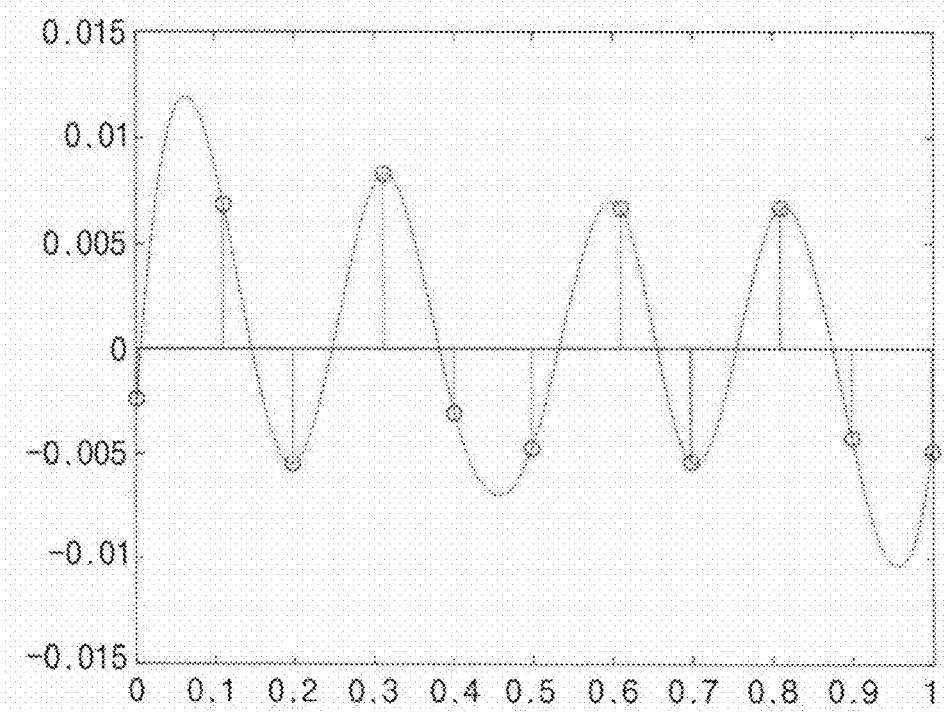

FIGS. 19A through 20B illustrate a lookup function or a lookup table produced for wiggling calibration by the moving plane chart PLC of FIG. 9A. A white board of 94% reflection rate has been used as the plane chart PLC and the white board has been aligned to be parallel with the optical axis of the ToF sensor. The white board has been moved sequentially twenty times by a desired (or, alternatively, predetermined) unit distance to cover a range of 1500 mm corresponding to the one cyclic period of a 100 MHz signal. Only the values of 3*3 pixels at the center portion of the white board have been sampled and the average value is determined as the representative offset value of the corresponding phase difference of distance. The measurement result of 21 measurement cycles is shown in FIG. 19A, and the fitting result is shown in FIG. 19B. For the purpose of comparison, the range of 1500 mm may be divided by ten, that is, the 11 measurement cycles may be performed. The measurement result of 11 measurement cycles is shown in FIG. 20A, and the fitting result is shown in FIG. 20B.

As illustrated in FIGS. 19A and 19B, it is difficult to obtain sufficient data even with 21 measurement cycles. The wiggling calibration is performed one by one per each ToF sensor, and thus such conventional method of moving chart takes two much test time.

In contrast, according to at least some example embodiments of the inventive concepts, the white board has been fixed at 500 mm from the ToF sensor, and the white board has been captured for 21 and 11 measurement cycles as the conventional cases.

As described with reference to FIGS. 15 through 17, the wiggling error may be determined based on the measured phase differences of all the pixels and the plurality of measurement cycles. The measurement results of 21 and 11 measurement cycles are superimposed in FIG. 21.

In case of the conventional moving plane chart PLC, the white board must be moved finely and thus it takes about 5~6 minutes for 21 measurement cycles. In contrast, the required capturing and calculation of the mapping table may be completed within several seconds.

If the temperature is changed during the wiggling calibration, errors may be caused in the measured phase differences. According to at least some example embodiments of the inventive concepts, the wiggling calibration may be completed within about three seconds, and thus the method according to at least some example embodiments of the inventive concepts is robust against the temperature change.

Figure 21:
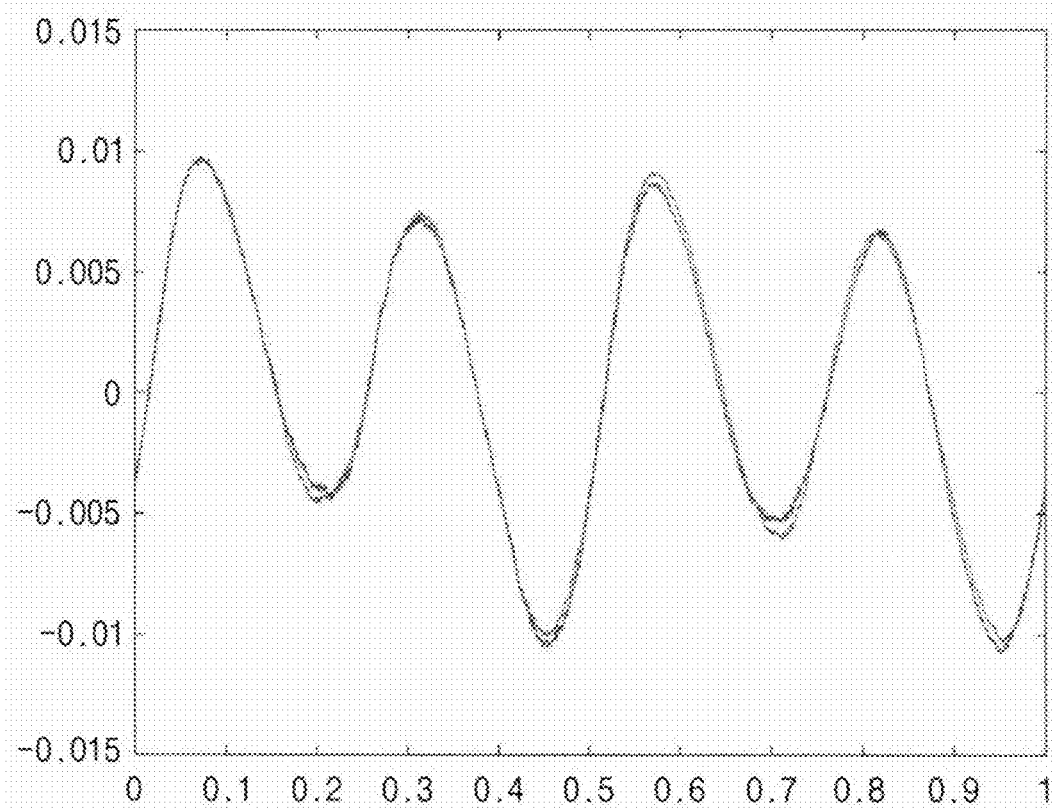

As illustrated in FIG. 21, the compact and smooth mapping table may be obtained according to at least some example embodiments of the inventive concepts, without additional nonlinear fitting. In addition, FIG. 21 shows that the result of 11 measurement cycles is substantially the same as the result of 21 measurement cycles, which means the wiggling error may be obtained through the smaller number of the measurement cycles.

Figure 22:
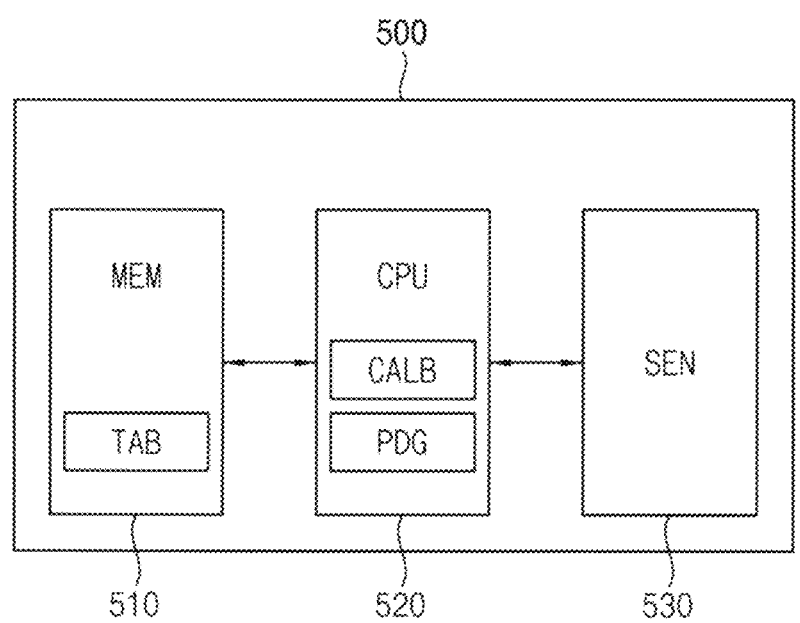
FIG. 22 is a block diagram illustrating a camera system according to at least some example embodiments of the inventive concepts.
Figure 23:
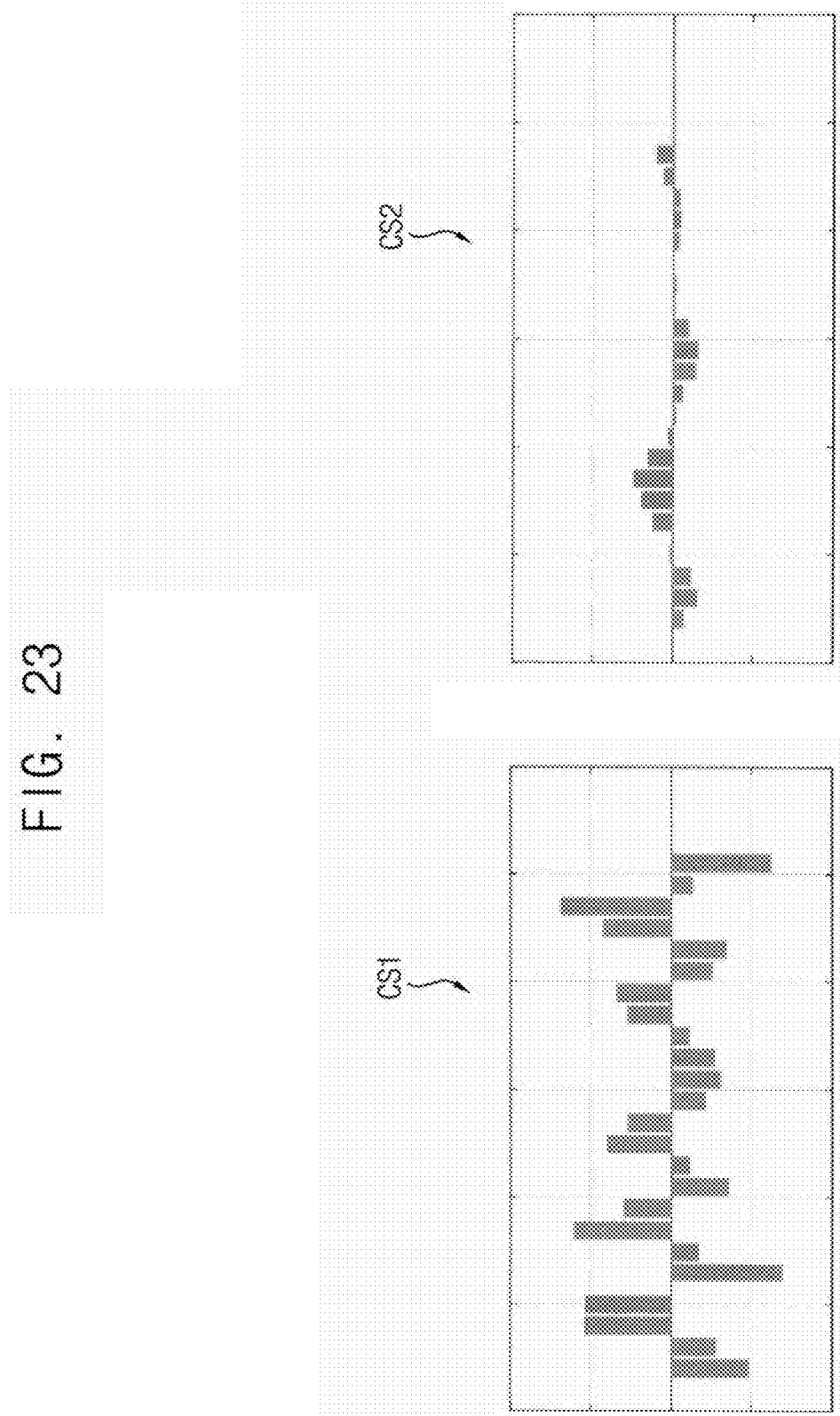
FIG. 23 is a diagram illustrating an error calibration by a camera system according to at least some example embodiments of the inventive concepts.

FIG. 22 is a block diagram illustrating a camera system according to at least some example embodiments of the inventive concepts, and FIG. 23 is a diagram illustrating an error calibration by a camera system according to at least some example embodiments of the inventive concepts.

Referring to FIG. 22, a camera system 500 may include a ToF sensor 530 coupled to and in communication with a processor CPU or host 520. The camera system 500 may also include a memory module 510 coupled to the processor 520 to store information content such as, but not limited to, data received from the ToF sensor 530. In addition, the memory module 510 may store a mapping table TAB of a wiggling error, which is determined by the methods according to at least some example embodiments of the inventive concepts.

According to at least some example embodiments of the inventive concepts, the entire camera system 500 may be encapsulated in a single Integrated Circuit (IC) or chip. Alternatively, one or more of the modules 510, 520 and 530 may be implemented in a separate chip.

The processor 520 may include a phase difference generator PDG and an error calibration unit CALB. According to at least some example embodiments of the event concepts, the phase difference generator PDG and error calibration unit CALB may each be embodied by a circuit or circuitry.

The phase difference generator PDG may provide measured phase differences based on sample data that are provided by sampling a reception light. According to at least some example embodiments of the inventive concepts, the phase difference generator PDG may be disposed in the ToF sensor 530, and in this case, the processor 520 may provide the measured phase differences instead of the sample data.

The error calibration unit CALB may calibrate a measured distance from the ToF sensor to a target object based on the wiggling error or the mapping table TAB. The first case CS1 in FIG. 23 indicates the deviations before the wiggling calibration and the second case CS2 in FIG. 23 indicates the deviations after the wiggling calibration.

The camera system 500 may be non-portable or portable. Some examples of the non-portable version of the camera system 500 may include, but are not limited to, a vehicle such as an automobile or a truck, an aircraft, an air-borne platform, a watercraft, a rail-guided vehicle, a driver-side mounted camera in a vehicle (for example, to monitor whether the driver is awake or not), a game console in a video arcade, an interactive video terminal, a machine vision system, an industrial robot, a VR equipment, and so on.

Some examples of the portable version of the camera system 500 may include, but are not limited to, popular consumer electronic gadgets such as a mobile device, a cellphone, a smartphone, a User Equipment (UE), a tablet, a digital camera, a laptop or desktop computer, an electronic smartwatch, a Machine-to-Machine (M2M) communication unit, a Virtual Reality (VR) equipment or module, a robot, and the like.

In some example embodiments, the processor 520 may be a CPU, which can be a microprocessor that processes program code. Processors executing program code are programmed processors, and thus, are special-purpose computers. In the discussion herein, the terms "processor" and "CPU" may be used interchangeably for ease of discussion. It is, however, understood that, instead of or in addition to the CPU, the processor 119 may contain any other type of processor such as, but not limited to, a microcontroller, a Digital Signal Processor (DSP), a Graphics Processing Unit (GPU), a dedicated Application Specific Integrated Circuit (ASIC) processor, and the like.

Figure 24:
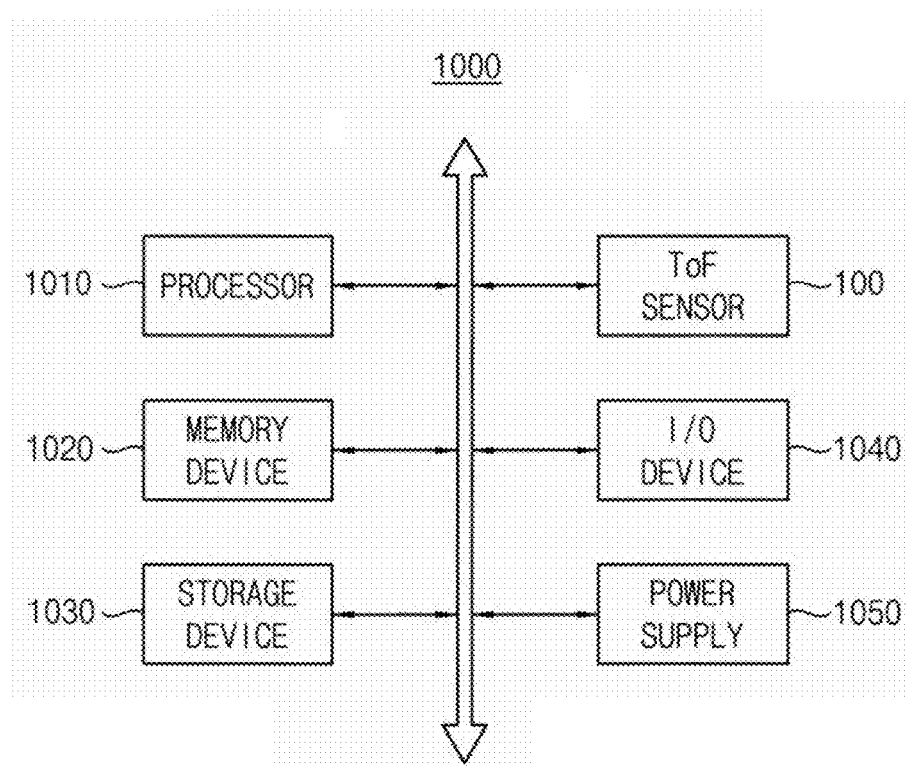
FIG. 24 is a block a block diagram illustrating a computing system including a ToF sensor according to at least some example embodiments of the inventive concepts.

FIG. 24 is a block a block diagram illustrating a computing system including a ToF sensor according to at least some example embodiments of the inventive concepts.

Referring to FIG. 24, a computing system 1000 includes a processor 1010, a memory device 1020, a storage device 1030, an input/output device 1040, a power supply 1050 and/or a ToF sensor 100. Although it is not illustrated in FIG. 24, the computing system 1000 may further include a port for communicating with electronic devices, such as a video card, a sound card, a memory card, a USB device, etc.

The processor 1010 may perform specific calculations and/or tasks. For example, the processor 1010 may be a microprocessor, a central process unit (CPU), a digital signal processor, or the like. The processor 1010 may communicate with the memory device 1020, the storage device 1030 and the input/output device 1040 via an address bus, a control bus and/or a data bus.

The processor 1010 may be coupled to an extension bus, such as a peripheral component interconnect (PCI) bus. The memory device 1020 may store data for operating the computing system 1020.

For example, the memory device 1020 may be implemented by a dynamic random access memory (DRAM), a mobile DRAM, a static random access memory (SRAM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like. The storage device 1030 may include a solid state drive, a hard disk drive, a CD-ROM, or the like. The input/output device 1040 may include an input device, such as a keyboard, a mouse, a keypad, etc., and an output device, such as a printer, a display device, or the like. The power supply 1050 may supply power to the computing device 1000.

The ToF sensor 100 may be coupled to the processor 1010 via the buses or other desired communication links. As described above, the ToF sensor 100 may efficiently measure various phase differences by implementing the different global delay phases according to the measurement cycles and the different local delay phases according to the pixel position. The ToF sensor 100 may be integrated with the processor 1010 in the same chip, or they may be integrated in respective chips.

Figure 25:
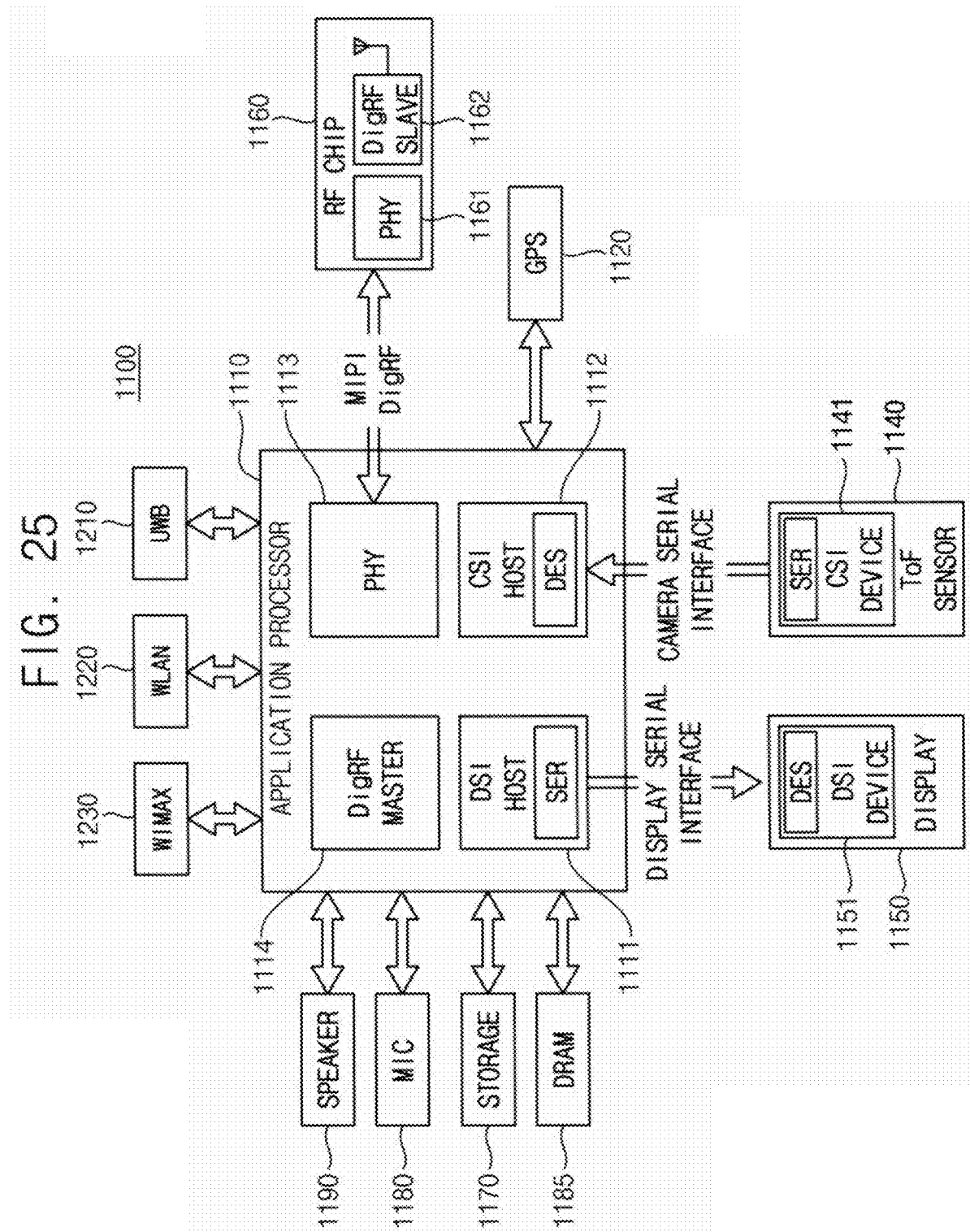
FIG. 25 is a block diagram illustrating an example of an interface used in a computing system of FIG. 24.

FIG. 25 is a block diagram illustrating an example of an interface used in a computing system of FIG. 24.

Referring to FIG. 25, a computing system 1100 may employ or support a MIPI interface, and may include an application processor 1110, a ToF sensor 1140 and a display device 1050. A CSI host 1112 of the application processor 1110 may perform a serial communication with a CSI device 1141 of the three-dimensional image sensor 1140 using a camera serial interface (CSI). In example embodiments, the CSI host 1112 may include a deserializer DES, and the CSI device 1141 may include a serializer SER. A DSI host 1111 of the application processor 1110 may perform a serial communication with a DSI device 1151 of the display device 1150 using a display serial interface (DSI). In example embodiments, the DSI host 1111 may include a serializer SER, and the DSI device 1151 may include a deserializer DES.

The computing system 1100 may further include a radio frequency (RF) chip 1160. A physical layer PHY 1113 of the application processor 1110 may perform data transfer with a physical layer PHY 1161 of the RF chip 1160 using a MIPI DigRF. The PHY 1113 of the application processor 1110 may interface (or, alternatively communicate) a DigRF MASTER 1114 for controlling the data transfer with the PHY 1161 of the RF chip 1160.

The computing system 1100 may further include a global positioning system (GPS) 1120, a storage device 1170, a microphone 1180, a DRAM 1185 and/or a speaker 1190. The computing system 1100 may communicate with external devices using an ultra wideband (UWB) communication 1210, a wireless local area network (WLAN) communication 1220, a worldwide interoperability for microwave access (WIMAX) communication 1230, or the like. However, example embodiments are not limited to configurations or interfaces of the computing system 1000 and 1100 illustrated in FIGS. 24 and 25.

Processors discussed in the present specification (e.g., processors 520, 1010, and 1110) may be processing circuitry such as hardware including logic circuits; a hardware/software combination executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), and programmable logic unit, a microprocessor, application-specific integrated circuit (ASIC), etc.

As described above, the ToF sensor and the method of calibrating errors in the ToF sensor according to at least some example embodiments of the inventive concepts may obtain the wiggling error with a small number of measurement cycles because samples of various distances or phase differences may be obtained through a single chart image using the plurality of local delay phases and the variable global delay phase.

At least some example embodiments of the inventive concepts, may be applied to any devices and systems including a ToF sensor. For example, at least one example embodiment of the inventive concepts may be applied to systems such as be a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, etc.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A method of calibrating errors in a time-of-flight (ToF) sensor, the method comprising:
   generating a modulation signal such that the modulation signal has different global delay phases respectively in a plurality of measurement cycles, wherein generating the modulation signal comprises:
      generating, using a variable delay circuit, the modulation signal such that the modulation signal has a variable delay depending on a control code; and
      changing the control code sequentially in the plurality of measurement cycles such that the modulation signal has the different global delay phases respectively in the plurality of measurement cycles;
   illuminating a test object with a transmission light that is modulated based on the modulation signal;
   generating, using a buffer chain circuit, a plurality of demodulation signals having different local delay phases among a plurality of local delay phases;
   providing a plurality of measured phase differences by providing the plurality of demodulation signals to a plurality of pixel groups included in a ToF sensor to sample a reception light reflected from the test object based on the plurality of demodulation signals;
   determining a wiggling error based on the plurality of measured phase differences, the wiggling error depending on a phase difference between the transmission light and the reception light; and
   calibrating a measured distance from the ToF sensor to a target object based on the wiggling error.

2. The method of claim 1, wherein the test object is fixed at a same position during the plurality of measurement cycles.

3. The method of claim 1, wherein the plurality of local delay phases are fixed during the plurality of measurement cycles.

4. The method of claim 1,
   wherein the wiggling error is determined based on the plurality of measured phase differences that are measured with respect to all pixels included in the ToF sensor, and
   wherein the plurality of measured phase differences are provided during each of the plurality of measurement cycles.

5. The method of claim 1, wherein the variable delay circuit is disposed outside the ToF sensor.

6. The method of claim 1, wherein the determining the wiggling error comprises:
   with respect to each pixel of a plurality of pixels included in the ToF sensor, fitting the measured phase differences corresponding to the each pixel and measured during the plurality of measurement cycles into each linear function;
   obtaining a plurality of offset values, each offset value corresponding to a difference between each measured phase difference corresponding to the each pixel and a value of the each linear function;
   obtaining, for each measured phase difference among the plurality of measured phase differences, a representative offset value based on the offset values corresponding to the each measured phase difference having the same value; and
   obtaining a mapping function representing the wiggling error based on the obtained representative offset values respectively corresponding to the measured phase differences having different values.

7. The method of claim 6, wherein the obtaining the mapping function includes generating a mapping table that maps the measured phase differences having the different values to the representative offset values.

8. The method of claim 1, wherein the buffer chain circuit is integrated in the ToF sensor.

9. A method of calibrating errors in a time-of-flight (ToF) sensor, the method comprising:
   generating a modulation signal such that the modulation signal has different global delay phases respectively in a plurality of measurement cycles;
   illuminating a test object with a transmission light that is modulated based on the modulation signal;
   generating, using a buffer chain circuit, a plurality of demodulation signals having different local delay phases among a plurality of local delay phases;
   providing a plurality of measured phase differences by providing the plurality of demodulation signals to a plurality of pixel groups included in a ToF sensor to sample a reception light reflected from the test object based on the plurality of demodulation signals, wherein the plurality of measured phase differences are provided during each of the plurality of measurement cycles;
   determining a wiggling error based on the plurality of measured phase differences, the wiggling error depending on a phase difference between the transmission light and the reception light, wherein the wiggling error is determined based on the plurality of measured phase differences that are measured with respect to all pixels included in the ToF sensor; and
   calibrating a measured distance from the ToF sensor to a target object based on the wiggling error.

10. A method of calibrating errors in a time-of-flight (ToF) sensor, the method comprising:
   generating, using a variable delay circuit, a modulation signal such that the modulation signal has different global delay phases respectively in a plurality of measurement cycles, wherein the variable delay circuit is disposed outside the ToF sensor;
   illuminating a test object with a transmission light that is modulated based on the modulation signal;
   generating, using a buffer chain circuit, a plurality of demodulation signals having different local delay phases among a plurality of local delay phases;
   providing a plurality of measured phase differences by providing the plurality of demodulation signals to a plurality of pixel groups included in a ToF sensor to sample a reception light reflected from the test object based on the plurality of demodulation signals;

determining a wiggling error based on the plurality of measured phase differences, the wiggling error depending on a phase difference between the transmission light and the reception light; and calibrating a measured distance from the ToF sensor to a target object based on the wiggling error.

* * * * *